US012744668B2

(12) United States Patent
Shrivastava et al.

(10) Patent No.: US 12,744,668 B2
(45) Date of Patent: Sep. 22, 2026

(54) ANONYMOUS IDENTIFIER TOKEN

(71) Applicant: QUALCOMM Incorporated, San Diego, CA (US)

(72) Inventors: Nimish Shrivastava, San Marcos, CA (US); Ketal Gandhi, San Diego, CA (US); Archana Shrivastava, San Diego, CA (US); Sagar Ramananda Jogadhenu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 18/735,102

(22) Filed: Jun. 5, 2024

(65) Prior Publication Data

US 2024/0430092 A1 Dec. 26, 2024

Related U.S. Application Data

(60) Provisional application No. 63/509,249, filed on Jun. 20, 2023.

(51) Int. Cl.
*H04L 9/32* (2006.01)
*H04W 12/06* (2021.01)

(52) U.S. Cl.
CPC .......... *H04L 9/3213* (2013.01); *H04L 9/3231* (2013.01); *H04W 12/06* (2013.01)

(58) Field of Classification Search
CPC ..... H04L 9/3213; H04L 9/3231; H04W 12/06
See application file for complete search history.

(56) References Cited

U.S. PATENT DOCUMENTS 8,200,980 B1 * 6/2012 Robinson ............... G06Q 20/40 713/186
2008/0021997 A1 1/2008 Hinton
2014/0304157 A1 10/2014 Bachenheimer et al.
2017/0243417 A1 * 8/2017 Manikantan Shila ....................... H04W 12/06
2021/0044580 A1 * 2/2021 Grødum .............. H04W 12/043
2024/0070315 A1 * 2/2024 Parla ................... G06F 21/6245
2024/0080195 A1 * 3/2024 Schrum ................... G06F 21/62

FOREIGN PATENT DOCUMENTS

EP 3208222 A1 8/2017

OTHER PUBLICATIONS

International Search Report and Written Opinion—PCT/US2024/032772—ISA/EPO—Oct. 15, 2024.

* cited by examiner

*Primary Examiner* — Henry Tsang
(74) *Attorney, Agent, or Firm* — Polsinelli LLP

(57) ABSTRACT

Disclosed are systems, apparatuses, processes, and computer-readable media for authentication. For instance, a process can include receiving first authentication information for a user; generating an authentication token based on the received first authentication information, wherein the authentication token does not include the first authentication information; receiving user information for the user; obtaining an anonymous identifier token, wherein the anonymous identifier token comprises a composite token, and wherein the anonymous identifier token includes an identity token generated based on the received user information; adding the authentication token to the anonymous identifier token; and storing the anonymous identifier token for authenticating a user.

16 Claims, 13 Drawing Sheets

Location Server
172
Core Network
170
mmW BS
180
UE
182
184
122
BS
102
UE
104
134
120
164
110
192
190
194
152
154
AP
150
SC
102'
110'
100

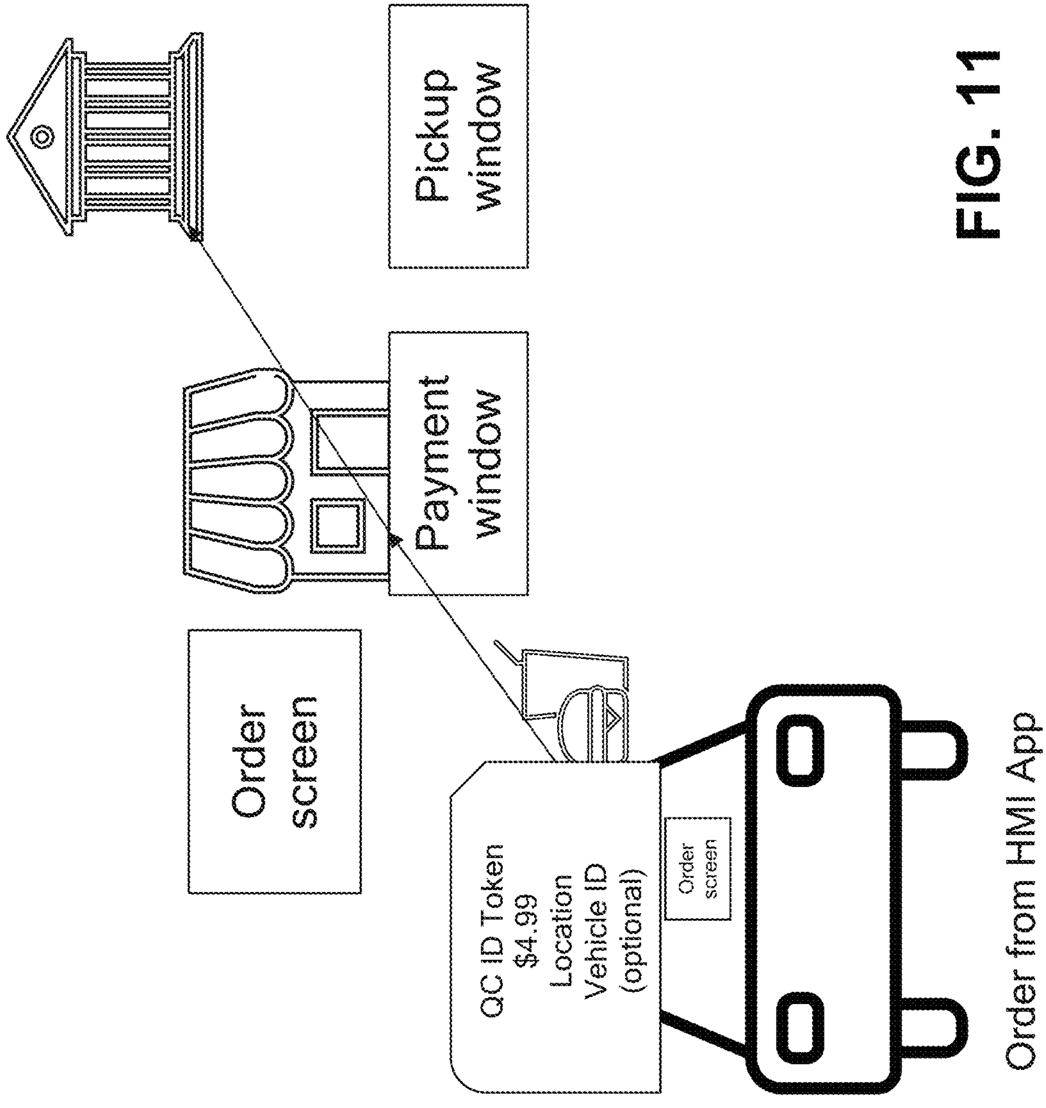
FIG. 11

ANONYMOUS IDENTIFIER TOKEN

CROSS-REFERENCE TO RELATED APPLICATIONS

This application claims the benefit of U.S. Provisional Patent Application No. 63/509,249, filed Jun. 20, 2023, which is hereby incorporated by reference, in its entirety and for all purposes.

FIELD

The present disclosure generally relates to device security. For example, aspects of the present disclosure relate to techniques for using an anonymous identifier token.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

Aspects of wireless communication have helped drive growth in IoT devices as well as IoT based systems, such as payment kiosks, card readers, point of sale (POS) devices, and so forth. These trends may soon expand to vehicles as more devices become integrated with vehicles. Thus, improvements to vehicle-based authentication and payments systems may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for threat reporting are provided. In one illustrative example, an apparatus for threat reporting is provided. The apparatus includes a memory and a processor coupled to the memory. The processor is configured to: receive first authentication information for a user; generate an authentication token based on the received first authentication information, wherein the authentication token does not include the first authentication information; receive user information for the user; obtain an anonymous identifier token, wherein the anonymous identifier token comprises a composite token, and wherein the anonymous identifier token includes an identity token generated based on the received user information; add the authentication token to the anonymous identifier token; and store the anonymous identifier token for authenticating a user.

As another example, a method for authentication is provided. The method includes receiving first authentication information for a user; generating an authentication token based on the received first authentication information, wherein the authentication token does not include the first authentication information; receiving user information for the user; obtaining an anonymous identifier token, wherein the anonymous identifier token comprises a composite token, and wherein the anonymous identifier token includes an identity token generated based on the received user information; adding the authentication token to the anonymous identifier token; and storing the anonymous identifier token for authenticating a user.

In another example, a non-transitory computer-readable medium is provided. The non-transitory computer readable medium has stored thereon instructions that, when executed by at least one processor, cause the at least one processor to receive first authentication information for a user; generate an authentication token based on the received first authentication information, wherein the authentication token does not include the first authentication information; receive user information for the user; obtain an anonymous identifier token, wherein the anonymous identifier token comprises a composite token, and wherein the anonymous identifier token includes an identity token generated based on the received user information; add the authentication token to the anonymous identifier token; and store the anonymous identifier token for authenticating a user.

As another example, an apparatus for authentication is provided. The apparatus includes means for receiving first authentication information for a user; means for generating an authentication token based on the received first authentication information, wherein the authentication token does not include the first authentication information; means for receiving user information for the user; means for obtaining an anonymous identifier token, wherein the anonymous identifier token comprises a composite token, and wherein the anonymous identifier token includes an identity token generated based on the received user information; means for adding the authentication token to the anonymous identifier token; and means for storing the anonymous identifier token for authenticating a user.

In some aspects, one or more of the apparatuses or devices described herein is, includes, or is part of, a vehicle (e.g., an automobile, truck, etc.) or a component or system of the vehicle, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a robotics device, or other device. In some aspects, the apparatus or device includes radio detection and ranging (radar) for capturing radio frequency (RF) signals. In some aspects, the apparatus or device includes one or more light detection and ranging (LIDAR) sensors, radar sensors, or other light-based sensors for capturing light-based (e.g., optical frequency) signals. In some aspects, the apparatus or device includes a camera or multiple cameras for capturing one or more images. In some aspects, the apparatus or device further includes a display for displaying one or more images, notifications, and/or other displayable data. In some aspects, the apparatus or device can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended for use in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures:

FIG. 11 illustrates an example computing system, according to aspects of the disclosure.

DETAILED DESCRIPTION

Figure 1:
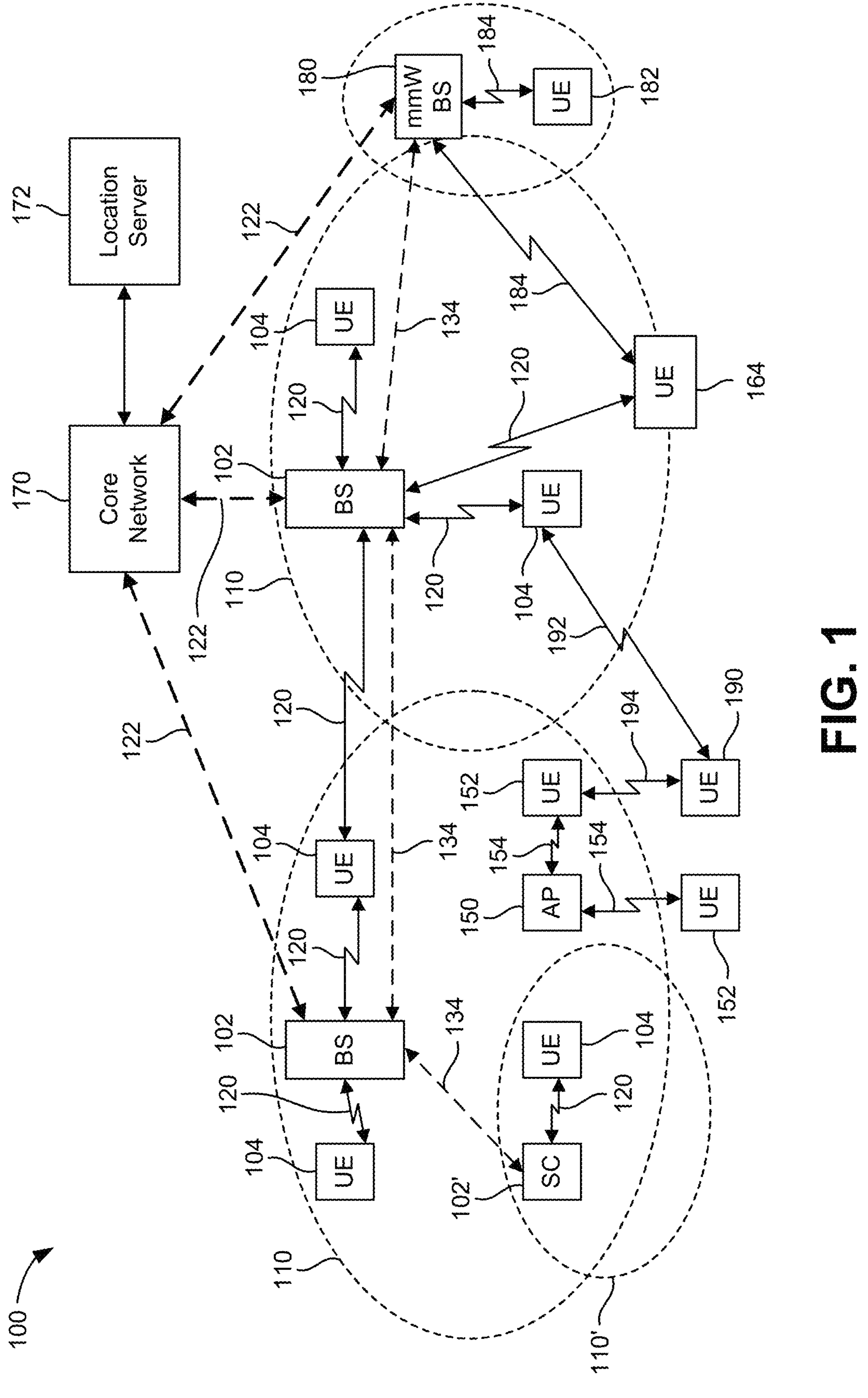
FIG. 1 is a diagram illustrating an example wireless communications system, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Wireless communications systems are deployed to provide various telecommunication services, including telephony, video, data, messaging, broadcasts, among others. Wireless communications systems have developed through various generations. A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Increasingly, vehicles are being upgraded with more features, including network connectivity. This increased connectivity may increase a desire to allow users to access and/or services from vehicles. However, unlike with some user devices, such as smartphones, tablets, etc., a vehicle may be associated with multiple drivers and/or passengers and providing payment (or services) on a per vehicle basis may not be desired. In some cases, a technique for providing a seamless authentication system, for example, for customization, payment, use authorization, etc. may be useful.

Systems, apparatuses, methods (also referred to as processes), and computer-readable media (collectively referred to herein as "systems and techniques") are described herein for providing and using an anonymous identifier token. In some cases, the anonymous identifier token may be a data structure containing information about a user without specifically identifying the user. The anonymous identifier token may be a composite token, which may be a type of token (e.g., data structure) that may include other tokens In some aspects, the systems and techniques can allow a single composite token to represent a user. For example, the composite token may include multiple tokens to allow multiple services to be performed with the composite token such as user authentication and other services for the authorized user using the composite token. For example, by attaching an authentication token (e.g., a token that authorizes a user to access a resource), such as provided by a biometrics identity service(s) and including the authentication token along with other tokens (e.g., a vehicle token, service specific token, payment token, etc.) in a composite token, such as an anonymous identifier token, within a user device (e.g., a vehicle), the composite token may be used to access services in the context of the user from a vehicle. The vehicle may be shared among multiple users. In some cases, each user can be represented by a respective composite token.

In some aspects, one or more of the apparatuses described herein comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a vehicle (or a computing device of a vehicle), or other device. In some aspects, the apparatus(es) includes at least one camera for capturing one or more images or video frames. For example, the apparatus(es) can include a camera (e.g., an RGB camera) or multiple cameras for capturing one or more images and/or one or more videos including video frames. In some aspects, the apparatus(es) includes at least one display for displaying one or more images, videos, notifications, or other displayable data. In some aspects, the apparatus(es) includes at least one transmitter configured to transmit one or more video frame and/or syntax data over a transmission medium to at least one device. In some aspects, the at least one processor includes a neural processing unit (NPU), a neural signal processor (NSP), a central processing unit (CPU), a graphics processing unit (GPU), any combination thereof, and/or other processing device or component.

Additional aspects of the present disclosure are described in more detail below.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

In some cases, a network entity can be implemented in an aggregated or monolithic base station or server architecture, or alternatively, in a disaggregated base station or server architecture, and may include one or more of a central unit (CU), a distributed unit (DU), a radio unit (RU), a Near-Real Time (Near-RT) RAN Intelligent Controller (RIC), or a Non-Real Time (Non-RT) RIC. In some cases, a network entity can include a server device, such as a Multi-access Edge Compute (MEC) device. A base station or server (e.g., with an aggregated/monolithic base station architecture or disaggregated base station architecture) may operate according to one of several RATs in communication with UEs, road side units (RSUs), and/or other devices depending on the network in which it is deployed, and may be alternatively referred to as an access point (AP), a network node, a NodeB (NB), an evolved NodeB (CNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical TRP or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A roadside unit (RSU) is a device that can transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that can be transmitted and received by an RSU includes vehicle-to-everything (V2X) messages, which are described in more detail below. RSUs can be located on various transportation infrastructure systems, including roads, bridges, parking lots, toll booths, and/or other infrastructure systems. In some examples, an RSU can facilitate communication between UEs (e.g., vehicles, pedestrian user devices, and/or other UEs) and the transportation infrastructure systems. In some implementations, a RSU can be in communication with a server, base station, and/or other system that can perform centralized management functions.

An RSU can communicate with a communications system of a UE. For example, an intelligent transport system (ITS) of a UE (e.g., a vehicle and/or other UE) can be used to generate and sign messages for transmission to an RSU and to validate messages received from an RSU. An RSU can communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU can determine or estimate traffic congestion information (e.g., a start of traffic congestion, an end of traffic congestion, etc.), a travel time, and/or other information for a particular location. In some examples, the RSU can communicate with other RSUs (e.g., over a PC5 interface, DSRC interface, etc.) in order to determine the traffic-related data. The RSU can transmit the information (e.g., traffic congestion information, travel time information, and/or other information) to other vehicles, pedestrian UEs, and/or other UEs. For example, the RSU can broadcast or otherwise transmit the information to any UE (e.g., vehicle, pedestrian UE, etc.) that is in a coverage range of the RSU.

A radio frequency signal or "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHZ.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain of other beams available to the receiver. This results in a stronger received signal strength, (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHZ) bandwidth per carrier up to a total of Yx MHZ (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

In order to operate on multiple carrier frequencies, a base station 102 and/or a UE 104 is equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
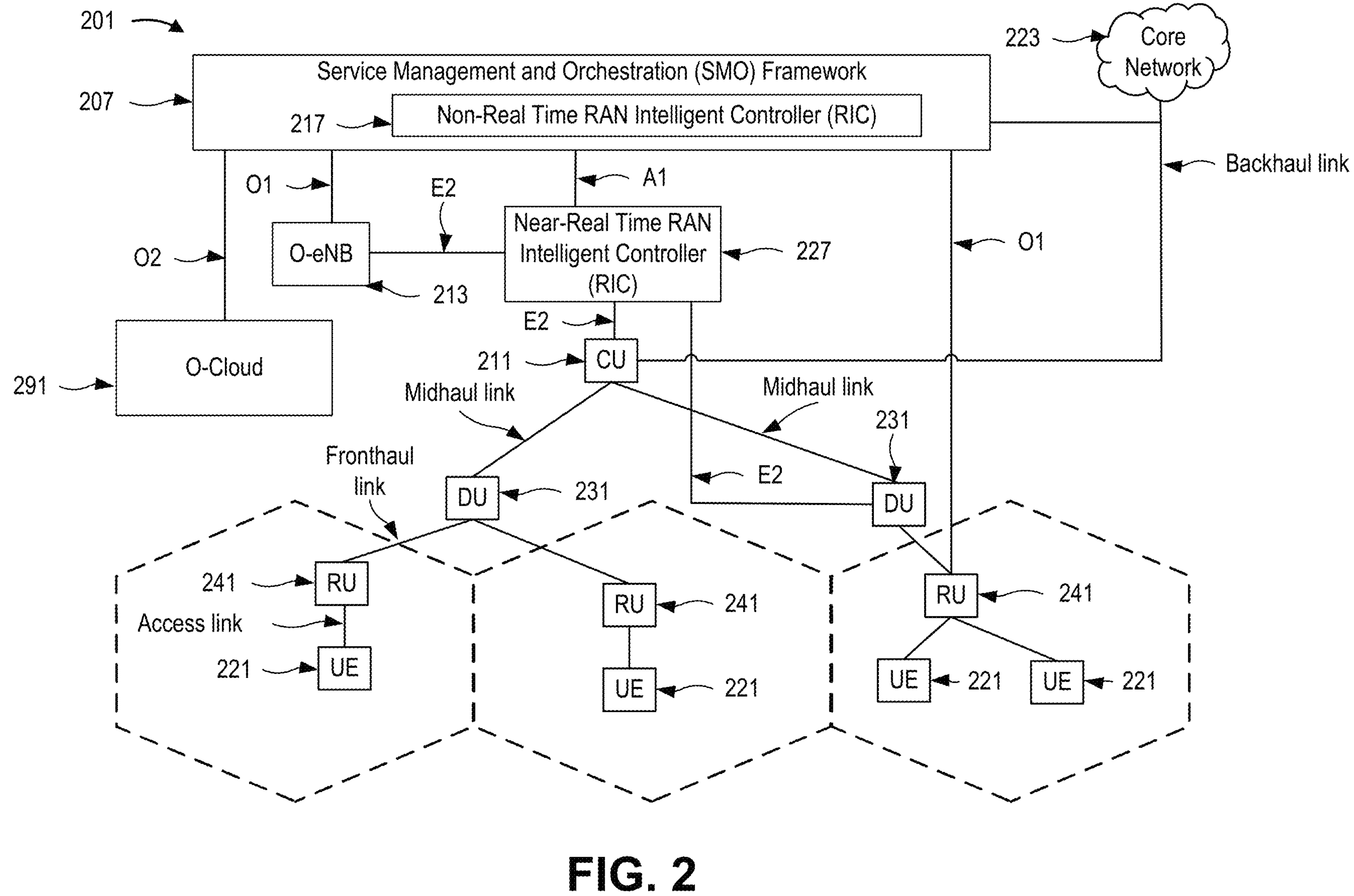
FIG. 2 is a diagram illustrating an example of a disaggregated base station architecture, which may be employed by the disclosed V2X-sensor misbehavior detection system, in accordance with some aspects of the present disclosure.

FIG. 2 is a diagram illustrating an example of a disaggregated base station architecture, which may be employed by the disclosed V2X-sensor misbehavior detection system, in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 2 is a diagram illustrating an example of a disaggregated base station architecture, which may be employed by the disclosed V2X-sensor misbehavior detection system, in accordance with some examples. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, AP, a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

As previously mentioned, FIG. 2 shows a diagram illustrating an example disaggregated base station 201 architecture. The disaggregated base station 201 architecture may include one or more central units (CUs) 211 that can communicate directly with a core network 223 via a backhaul link, or indirectly with the core network 223 through one or more disaggregated base station units (such as a Near-Real Time (Near-RT) RAN Intelligent Controller (RIC) 227 via an E2 link, or a Non-Real Time (Non-RT) RIC 217 associated with a Service Management and Orchestration (SMO) Framework 207, or both). A CU 211 may communicate with one or more distributed units (DUs) 231 via respective midhaul links, such as an F1 interface. The DUs 231 may communicate with one or more radio units (RUs) 241 via respective fronthaul links. The RUs 241 may communicate with respective UEs 221 via one or more RF access links. In some implementations, the UE 221 may be simultaneously served by multiple RUs 241.

Each of the units, i.e., the CUS 211, the DUs 231, the RUs 241, as well as the Near-RT RICs 227, the Non-RT RICs 217 and the SMO Framework 207, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 211 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 211. The CU 211 may be configured to handle user plane functionality (i.e., Central Unit-User Plane (CU-UP)), control plane functionality (i.e., Central Unit-Control Plane (CU-CP)), or a combination thereof. In some implementations, the CU 211 can be logically split into one or more CU-UP units and one or more CU-CP units. The CU-UP unit can communicate bidirectionally with the CU-CP unit via an interface, such as the E1 interface when implemented in an O-RAN configuration. The CU 211 can be implemented to communicate with the DU 131, as necessary, for network control and signaling.

The DU 231 may correspond to a logical unit that includes one or more base station functions to control the operation of one or more RUs 241. In some aspects, the DU 231 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 231 may further host one or more low PHY layers. Each layer (or module) can be implemented with an interface configured to communicate signals with other layers (and modules) hosted by the DU 231, or with the control functions hosted by the CU 211.

Lower-layer functionality can be implemented by one or more RUs 241. In some deployments, an RU 241, controlled by a DU 231, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 241 can be implemented to handle over the air (OTA) communication with one or more UEs 221. In some implementations, real-time and non-real-time aspects of control and user plane communication with the RU(s) 241 can be controlled by the corresponding DU 231. In some scenarios, this configuration can enable the DU(s) 231 and the CU 211 to be implemented in a cloud-based RAN architecture, such as a vRAN architecture.

The SMO Framework 207 may be configured to support RAN deployment and provisioning of non-virtualized and virtualized network elements. For non-virtualized network elements, the SMO Framework 207 may be configured to support the deployment of dedicated physical resources for RAN coverage requirements which may be managed via an operations and maintenance interface (such as an O1 interface). For virtualized network elements, the SMO Framework 207 may be configured to interact with a cloud computing platform (such as an open cloud (O-Cloud) 291) to perform network element life cycle management (such as to instantiate virtualized network elements) via a cloud computing platform interface (such as an O2 interface). Such virtualized network elements can include, but are not limited to, CUs 211, DUs 231, RUs 241 and Near-RT RICs 227. In some implementations, the SMO Framework 207 can communicate with a hardware aspect of a 4G RAN, such as an open eNB (O-eNB) 213, via an O1 interface. Additionally, in some implementations, the SMO Framework 207 can communicate directly with one or more RUs 241 via an O1 interface. The SMO Framework 207 also may include a Non-RT RIC 217 configured to support functionality of the SMO Framework 207.

The Non-RT RIC 217 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 227. The Non-RT RIC 217 may be coupled to or communicate with (such as via an A1 interface) the Near-RT RIC 227. The Near-RT RIC 227 may be configured to include a logical function that enables near-real-time control and optimization of RAN elements and resources via data collection and actions over an interface (such as via an E2 interface) connecting one or more CUs 211, one or more DUs 231, or both, as well as an O-eNB 213, with the Near-RT RIC 227.

In some implementations, to generate AI/ML models to be deployed in the Near-RT RIC 227, the Non-RT RIC 217 may receive parameters or external enrichment information from external servers. Such information may be utilized by the Near-RT RIC 227 and may be received at the SMO Framework 207 or the Non-RT RIC 217 from non-network data sources or from network functions. In some examples, the Non-RT RIC 217 or the Near-RT RIC 227 may be configured to tune RAN behavior or performance. For example, the Non-RT RIC 217 may monitor long-term trends and patterns for performance and employ AI/ML models to perform corrective actions through the SMO Framework 207 (such as reconfiguration via 01) or via creation of RAN management policies (such as A1 policies).

Figure 3:
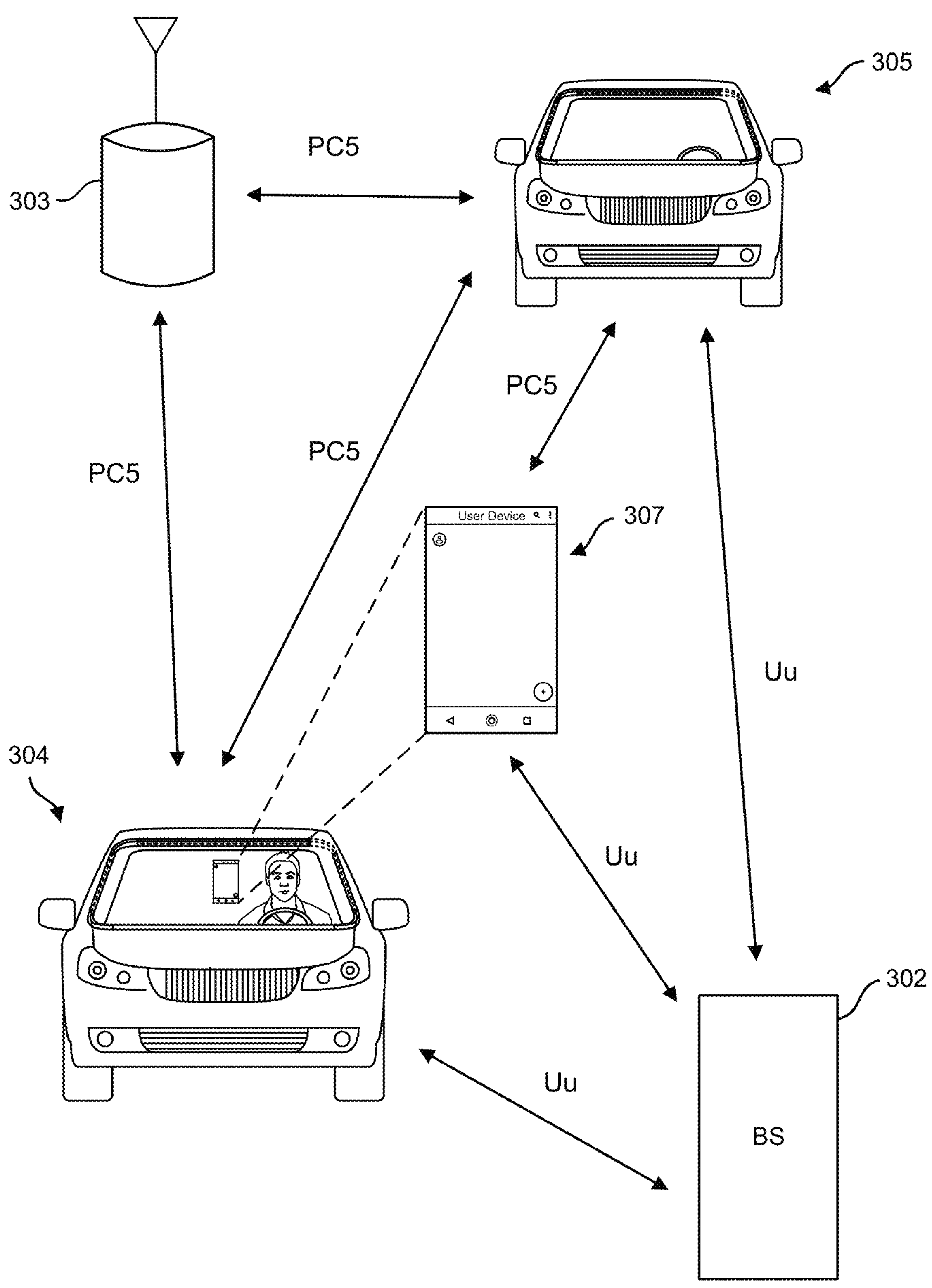
FIG. 3 is a diagram illustrating an example of various user equipment (UEs) communicating over direct communication interfaces (e.g., a cellular based PC5 sidelink interface, 802.11p defined DSRC interface, or other direct interface) and wide area network (Uu) interfaces, in accordance with some aspects of the present disclosure.

FIG. 3 illustrates examples of different communication mechanisms used by various UEs. In one example of sidelink communications, FIG. 3 illustrates a vehicle 304, a vehicle 305, and an RSU 303 communicating with each other using PC5, DSRC, or other device to device direct signaling interfaces. In addition, the vehicle 304 and the vehicle 305 may communicate with a base station 302 (shown as BS 302) using a network (Uu) interface. The base station 302 can include a gNB in some examples. FIG. 3 also illustrates a user device 307 communicating with the base station 302 using a network (Uu) interface. In some cases, the user device 307 may also communicate with the vehicle 304 and/or vehicle 305 using PC5, DSRC, or other device to device direct signaling interfaces While FIG. 3 illustrates a particular number of vehicles (e.g., two vehicles 304 and 305) communicating with each other and/or with RSU 303, BS 302, and/or user device 307, the present disclosure is not limited thereto. For instance, tens or hundreds of such vehicles may be communicating with one another and/or with RSU 303, BS 302, and/or user device 307. At any given point in time, each such vehicle, RSU 303, BS 302, and/or user device 307 may transmit various types of information as messages to other nearby vehicles resulting in each vehicle (e.g., vehicles 304 and/or 305), RSU 303, BS 302, and/or user device 307 receiving hundreds or thousands of messages from other nearby vehicles, RSUs, base stations, and/or other UEs per second.

While PC5 interfaces are shown in FIG. 3, the various UEs (e.g., vehicles, user devices, etc.) and RSU(s) can communicate directly using any suitable type of direct interface, such as an 802.11 DSRC interface, a Bluetooth™ interface, and/or other interface. For example, a vehicle can communicate with a user device over a direct communications interface (e.g., using PC5 and/or DSRC), a vehicle can communicate with another vehicle over the direct communications interface, a user device can communicate with another user device over the direct communications interface, a UE (e.g., a vehicle, user device, etc.) can communicate with an RSU over the direct communications interface, an RSU can communicate with another RSU over the direct communications interface, and the like.

Figure 4:
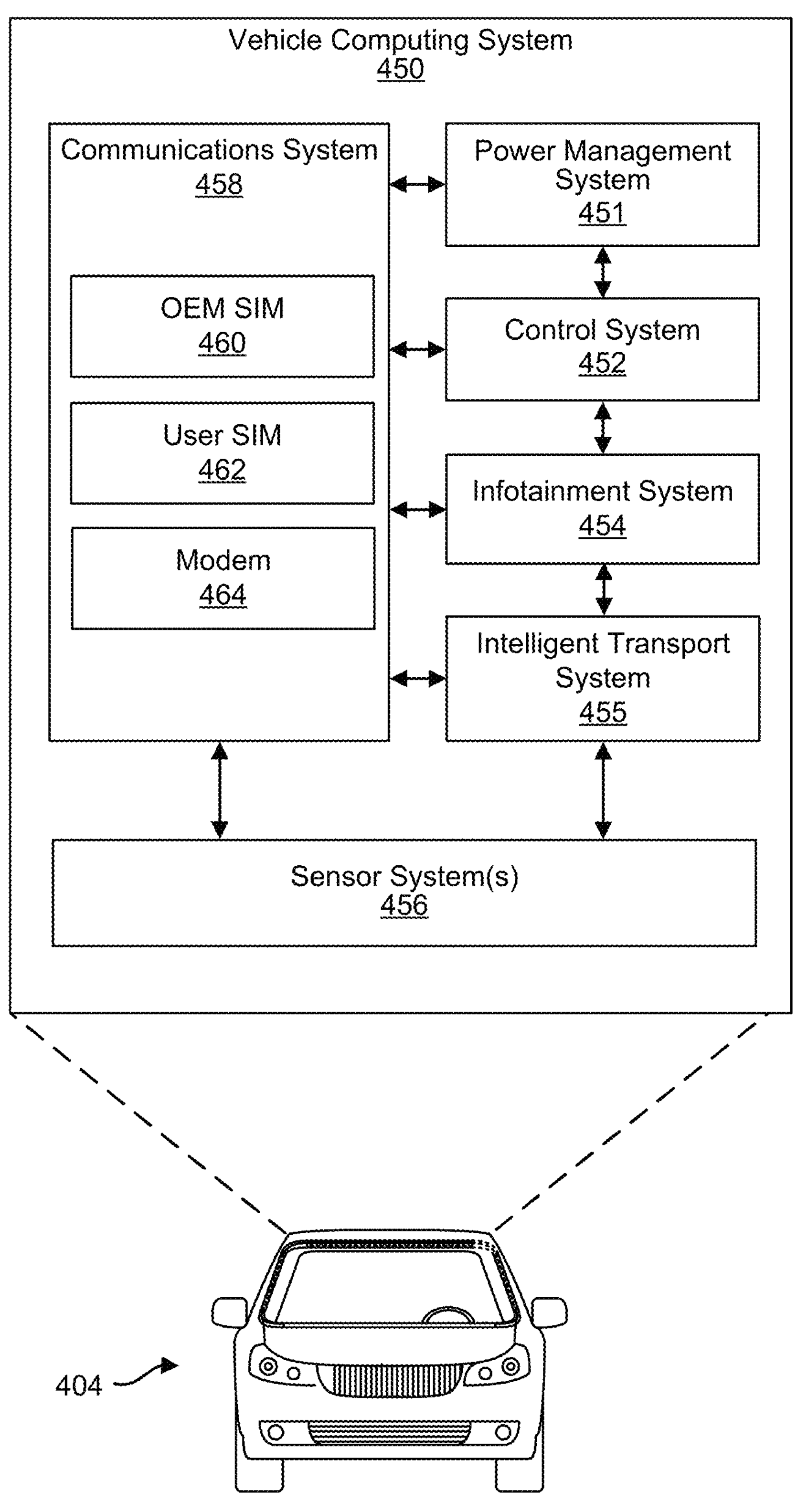
FIG. 4 is a block diagram illustrating an example of a computing system of a vehicle, in accordance with some aspects of the present disclosure.

FIG. 4 is a block diagram illustrating an example a vehicle computing system 450 of a vehicle 404. The vehicle 404 is an example of a UE that can communicate with a network (e.g., an eNB, a gNB, a positioning beacon, a location measurement unit, and/or other network entity) over a Uu interface and with other UEs using V2X communications over a PC5 interface (or other device to device direct interface, such as a DSRC interface). As shown, the vehicle computing system 450 can include at least a power management system 451, a control system 452, an infotainment system 454, an intelligent transport system (ITS) 455, one or more sensor systems 456, and a communications system 458. In some cases, the vehicle computing system 450 can include or can be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 can be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 can include one or more electronic control units (ECUs). An ECU can control one or more of the electrical systems or subsystems in a vehicle. Examples of specific ECUs that can be included as part of the control system 452 include an engine control module (ECM), a powertrain control module (PCM), a transmission control module (TCM), a brake control module (BCM), a central control module (CCM), a central timing module (CTM), among others. In some cases, the control system 452 can receive sensor signals from the one or more sensor systems 456 and can communicate with other systems of the vehicle computing system 450 to operate the vehicle 404.

The vehicle computing system 450 also includes a power management system 451. In some implementations, the power management system 451 can include a power management integrated circuit (PMIC), a standby battery, and/or other components. In some cases, other systems of the vehicle computing system 450 can include one or more PMICs, batteries, and/or other components. The power management system 451 can perform power management functions for the vehicle 404, such as managing a power supply for the computing system 450 and/or other parts of the vehicle. For example, the power management system 451 can provide a stable power supply in view of power fluctuations, such as based on starting an engine of the vehicle. In another example, the power management system 451 can perform thermal monitoring operations, such as by checking ambient and/or transistor junction temperatures. In another example, the power management system 451 can perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 can include both software and hardware components for transmitting signals to and receiving signals from a network (e.g., a gNB or other network entity over a Uu interface) and/or from other UEs (e.g., to another vehicle or UE over a PC5 interface, WiFi interface (e.g., DSRC), Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 can have any number of SIMs (e.g., one SIM or more than two SIMs) and any number of modems (e.g., one modem, two modems, or more than two modems) in some implementations.

A SIM is a device (e.g., an integrated circuit) that can securely store an international mobile subscriber identity (IMSI) number and a related key (e.g., an encryption-decryption key) of a particular subscriber or user. The IMSI and key can be used to identify and authenticate the subscriber on a particular UE. The OEM SIM 460 can be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 can be important for the OEM SIM to support critical services, such as eCall for making emergency calls in the event of a car accident or other emergency. For instance, eCall can include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 462 can be used by the communications system 458 for performing wireless network access functions in order to support a user data connection (e.g., for conducting phone calls, messaging, Infotainment related services, among others). In some cases, a user device of a user can connect with the vehicle computing system 450 over an interface (e.g., over PC5, Bluetooth™, WiFI™ (e.g., DSRC), a universal serial bus (USB) port, and/or other wireless or wired interface). Once connected, the user device can transfer wireless network access functionality from the user device to communications system 458 the vehicle, in which case the user device can cease performance of the wireless network access functionality (e.g., during the period in which the communications system 458 is performing the wireless access functionality). The communications system 458 can begin interacting with a base station to perform one or more wireless communication operations, such as facilitating a phone call, transmitting and/or receiving data (e.g., messaging, video, audio, etc.), among other operations. In such cases, other components of the vehicle computing system 450 can be used to output data received by the communications system 458. For example, the infotainment system 454 (described below) can display video received by the communications system 458 on one or more displays and/or can output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) can be used for communication of data for the OEM SIM 460 and/or the user SIM 462. In some examples, the modem 464 can include a 4G (or LTE) modem and another modem (not shown) of the communications system 458 can include a 5G (or NR) modem. In some examples, the communications system 458 can include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) can be used for performing V2X communications (e.g., with other vehicles for V2V communications, with other devices for D2D communications, with infrastructure systems for V2I communications, with pedestrian UEs for V2P communications, etc.). In some examples, the communications system 458 can include a V2X modem used for performing V2X communications (e.g., sidelink communications over a PC5 interface or DSRC interface), in which case the V2X modem can be separate from one or more modems used for wireless network access functions (e.g., for network communications over a network/Uu interface and/or sidelink communications other than V2X communications).

In some examples, the communications system 458 can be or can include a telematics control unit (TCU). In some implementations, the TCU can include a network access device (NAD) (also referred to in some cases as a network control unit or NCU). The NAD can include the modem 464, any other modem not shown in FIG. 4, the OEM SIM 460, the user SIM 462, and/or other components used for wireless communications. In some examples, the communications system 458 can include a Global Navigation Satellite System (GNSS). In some cases, the GNSS can be part of the one or more sensor systems 456, as described below. The GNSS can provide the ability for the vehicle computing system 450 to perform one or more location services, navigation services, and/or other services that can utilize GNSS functionality.

In some cases, the communications system 458 can further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that can allow the vehicle 404 to communicate with a network and/or other UEs.

The vehicle computing system 450 can also include an infotainment system 454 that can control content and one or more output devices of the vehicle 404 that can be used to output the content. The infotainment system 454 can also be referred to as an in-vehicle infotainment (IVI) system or an In-car entertainment (ICE) system. The content can include navigation content, media content (e.g., video content, music or other audio content, and/or other media content), among other content. The one or more output devices can include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some cases, the infotainment system 454 may include input systems that may be used to interact with the vehicle computing system 450. For example, the infotainment system may include a touchscreen, keypad, dial input, scroll wheel, touchpad, knobs, buttons, virtual keyboards, any combination thereof, and the like. In some cases, another device may be used to provide input to the infotainment system 454. For example, the infotainment system 454 may be remotely controlled (e.g., via a wired or wireless connection) by a user device (e.g., UEs 104, 152, 190, 164, 182 of FIG. 1, UE 221 of FIG. 2, user device 307 of FIG. 3, user device 507 of FIG. 5). As another example, an input device of the user device, such as a virtual keyboard displayed on the user device, may be used to provide input to the infotainment system 454. In some cases, the infotainment system 454 may be capable of authenticating a user of the infotainment system 454. For example, the infotainment system 454 may include an authentication system which may request that a user of the infotainment system 454 to log into the infotainment system 454. As another example, the infotainment system 454 may into a biometric system which may authenticate a user based on a fingerprint, facial recognition, voice, and/or any other physiological characteristic of a person. In some cases, the infotainment system 454 may authenticate a user based on a user device associated with the user. For example, the infotainment system 454 may be associated with the user device during a pairing or other registration procedure. In some cases, the infotainment system 454 may use a biometric system of the user device to authenticate the user. In some cases, the infotainment system 454 may communicate with a user device via, for example, the communications system 458 and/or an ITS 455.

In some examples, the computing system 450 can include the ITS 455. In some examples, the ITS 455 can be used for implementing V2X communications. For example, an ITS stack of the ITS 455 can generate V2X messages based on information from an application layer of the ITS. In some cases, the application layer can determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 can obtain car access network (CAN) information (e.g., from other components of the vehicle via a CAN bus). In some examples, the communications system 458 (e.g., a TCU NAD) can obtain the CAN information via the CAN bus and can send the CAN information to a PHY/MAC layer of the ITS 455. The ITS 455 can provide the CAN information to the ITS stack of the ITS 455. The CAN information can include vehicle related information, such as a heading of the vehicle, speed of the vehicle, breaking information, among other information. The CAN information can be continuously or periodically (e.g., every 1 millisecond (ms), every 10 ms, or the like) provided to the ITS 455.

The conditions used to determine whether to generate messages can be determined using the CAN information based on safety-related applications and/or other applications, including applications related to road safety, traffic efficiency, infotainment, business, and/or other applications. In one illustrative example, the ITS 455 can perform lane change assistance or negotiation. For instance, using the CAN information, the ITS 455 can determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 can determine a lane-change condition has been met that is associated with a message to be sent to other vehicles that are nearby the vehicle in the adjacent lane. The ITS 455 can trigger the ITS stack to generate one or more messages for transmission to the other vehicles, which can be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 can use any suitable protocol to generate messages (e.g., V2X messages). Examples of protocols that can be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 can be used to securely sign messages from the ITS stack that are sent to and verified by other UEs configured for V2X communications, such as other vehicles, pedestrian UEs, and/or infrastructure systems. The security layer can also verify messages received from such other UEs. In some implementations, the signing and verification processes can be based on a security context of the vehicle. In some examples, the security context may include one or more encryption-decryption algorithms, a public and/or private key used to generate a signature using an encryption-decryption algorithm, and/or other information. For example, each ITS message generated by the ITS 455 can be signed by the security layer of the ITS 455. The signature can be derived using a public key and an encryption-decryption algorithm. A vehicle, pedestrian UE, and/or infrastructure system receiving a signed message can verify the signature to make sure the message is from an authorized vehicle. In some examples, the one or more encryption-decryption algorithms can include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 can determine certain operations (e.g., V2X-based operations) to perform based on messages received from other UEs. The operations can include safety-related and/or other operations, such as operations for road safety, traffic efficiency, infotainment, business, and/or other applications. In some examples, the operations can include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message can be received by the communications system 458 from another vehicle (e.g., over a PC5 interface, a DSRC interface, or other device to device direct interface) indicating that the other vehicle is coming to a sudden stop. In response to receiving the message, the ITS stack can generate a message or instruction and can send the message or instruction to the control system 452, which can cause the control system 452 to automatically break the vehicle 404 so that it comes to a stop before making impact with the other vehicle. In other illustrative examples, the operations can include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

In some examples, the ITS 455 can receive a large number of messages from the other UEs (e.g., vehicles, RSUs, etc.), in which case the ITS 455 will authenticate (e.g., decode and decrypt) each of the messages and/or determine which operations to perform. Such a large number of messages can lead to a large computational load for the vehicle computing system 450. In some cases, the large computational load can cause a temperature of the computing system 450 to increase. Rising temperatures of the components of the computing system 450 can adversely affect the ability of the computing system 450 to process the large number of incoming messages. One or more functionalities can be transitioned from the vehicle 404 to another device (e.g., a user device, a RSU, etc.) based on a temperature of the vehicle computing system 450 (or component thereof) exceeding or approaching one or more thermal levels. Transitioning the one or more functionalities can reduce the computational load on the vehicle 404, helping to reduce the temperature of the components. A thermal load balancer can be provided that enable the vehicle computing system 450 to perform thermal based load balancing to control a processing load depending on the temperature of the computing system 450 and processing capacity of the vehicle computing system 450.

The computing system 450 further includes one or more sensor systems 456 (e.g., a first sensor system through an Nth sensor system, where N is a value equal to or greater than 0). When including multiple sensor systems, the sensor system(s) 456 can include different types of sensor systems that can be arranged on or in different parts the vehicle 404. The sensor system(s) 456 can include one or more camera sensor systems, LIDAR sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems can be included as part of the computing system 450 of the vehicle 404.

While the vehicle computing system 450 is shown to include certain components and/or systems, one of ordinary skill will appreciate that the vehicle computing system 450 can include more or fewer components than those shown in FIG. 4. For example, the vehicle computing system 450 can also include one or more input devices and one or more output devices (not shown). In some implementations, the vehicle computing system 450 can also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor can include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory can include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory can be executed to perform one or more of the functions or operations described herein.

Figure 5:
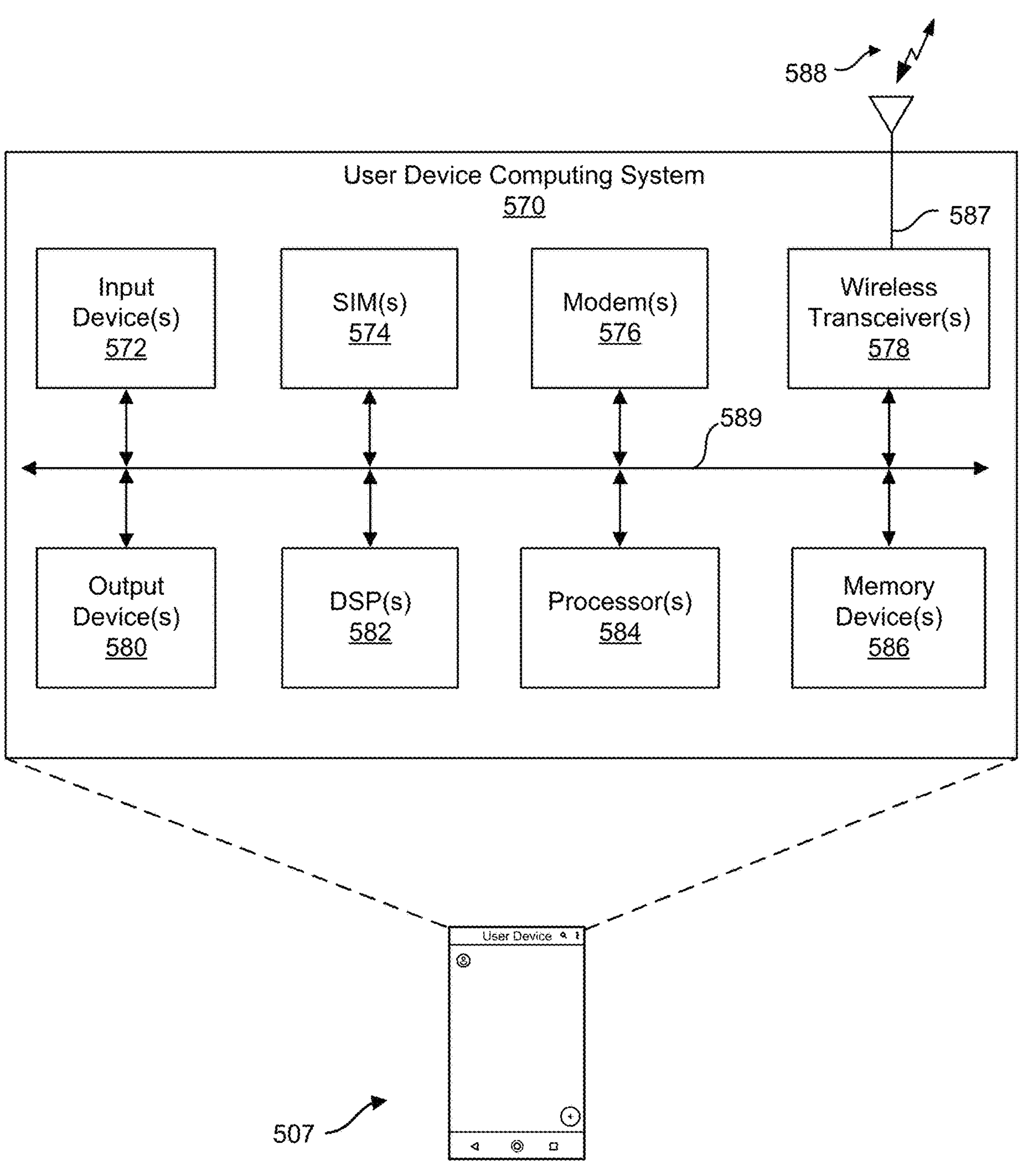
FIG. 5 is a block diagram illustrating an example of a computing system of a user device, in accordance with some aspects of the present disclosure.

FIG. 5 illustrates an example of a computing system 570 of a user device 507. The user device 507 is an example of a UE that can be used by an end-user. For example, the user device 507 can include a mobile phone, router, tablet computer, laptop computer, tracking device, wearable device (e.g., a smart watch, glasses, an XR device, etc.), Internet of Things (IoT) device, and/or other device used by a user to communicate over a wireless communications network. The computing system 570 includes software and hardware components that can be electrically or communicatively coupled via a bus 589 (or may otherwise be in communication, as appropriate). For example, the computing system 570 includes one or more processors 584. The one or more processors 584 can include one or more CPUs, ASICS, FPGAs, APs, GPUs, VPUs, NSPs, microcontrollers, dedicated hardware, any combination thereof, and/or other processing device or system. The bus 589 can be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, biometric sensor(s) and/or the like), and one or more output devices 580 (e.g., a display, a speaker, a printer, and/or the like).

The one or more wireless transceivers 578 can receive wireless signals (e.g., signal 588) via antenna 587 from one or more other devices, such as other user devices, vehicles (e.g., vehicle 404 of FIG. 4 described above), network devices (e.g., base stations such as eNBs and/or gNBs, WiFI routers, etc.), cloud networks, and/or the like. In some examples, the computing system 570 can include multiple antennae. The wireless signal 588 may be transmitted via a wireless network. The wireless network may be any wireless network, such as a cellular or telecommunications network (e.g., 3G, 4G, 5G, etc.), wireless local area network (e.g., a WiFi network), a Bluetooth™ network, and/or other network. In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 588 into a baseband or intermediate frequency and can convert the RF signals to the digital domain.

In some cases, the computing system 570 can include a coding-decoding device (or CODEC) configured to encode and/or decode data transmitted and/or received using the one or more wireless transceivers 578. In some cases, the computing system 570 can include an encryption-decryption device or component configured to encrypt and/or decrypt data (e.g., according to the AES and/or DES standard) transmitted and/or received by the one or more wireless transceivers 578.

The one or more SIMs 574 can each securely store an IMSI number and related key assigned to the user of the user device 507. As noted above, the IMSI and key can be used to identify and authenticate the subscriber when accessing a network provided by a network service provider or operator associated with the one or more SIMs 574. The one or more modems 576 can modulate one or more signals to encode information for transmission using the one or more wireless transceivers 578. The one or more modems 576 can also demodulate signals received by the one or more wireless transceivers 578 in order to decode the transmitted information. In some examples, the one or more modems 576 can include a 4G (or LTE) modem, a 5G (or NR) modem, a modem configured for V2X communications, and/or other types of modems. The one or more modems 576 and the one or more wireless transceivers 578 can be used for communicating data for the one or more SIMs 574.

The computing system 570 can also include (and/or be in communication with) one or more non-transitory machine-readable storage media or storage devices (e.g., one or more memory devices 586), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 586 and executed by the one or more processor(s) 584 and/or the one or more DSPs 582. The computing system 570 can also include software elements (e.g., located within the one or more memory devices 586), including, for example, an operating system, device drivers, executable libraries, and/or other code, such as one or more application programs, such as a V2X application, which may comprise computer programs implementing the functions provided by various aspects, and/or may be designed to implement methods and/or configure systems, as described herein.

In some examples, the processor(s) 584 may execute one or more software elements for utilizing anonymous identifier tokens. A token may be a code (e.g., encrypted string, certificate, key, etc.) which indicates some aspect of an associated user. For example, an authentication token may indicate that a user associated with the authentication token has been logged in (e.g., signed in) with a corresponding service. As another example, a vehicle token may indicate that a particular user is authorized to use a vehicle (e.g., via an associated authentication token, anonymous identifier token, etc.) and/or include vehicle personalization information associated with the user (e.g., climate control settings, radio settings, seat adjustments, permitting operating hours/timeframe, etc.). Similarly, a payment token may indicate account details for an associated user for making a payment. In some cases, anonymous identifier tokens may be a composite token which may be a container that includes a plurality of other tokens and/or data. In some cases, multiple tokens may be stored in an anonymous identifier token along with data associated with the user and/or the vehicle. For example, the anonymous identifier token may represent a user, for example, with a secure identifier, such as an identity token. The anonymous identifier token may also contain other tokens associated with the user, such as a payment token, service specific tokens, authentication tokens, vehicle token, blockchain-based token, and the like, as well as data, such as for data used for specific transactions, personalization information, information associated with certain vehicles, information associated with the user, permissions, and the like. In some cases, anonymous identifier tokens may also be passed between devices to, for example, authenticate a user, make payments, personalize a vehicle for the user, etc. By allowing a single composite token associated with a specific user to include multiple tokens associated with that user, for example for authenticating and providing payment information, multiple users may be able to use a single device, such as a vehicle, to authorize and/or pay for various services using the composite tokens associated with the specific users. In some cases, the anonymous identifier token or portions of the anonymous identifier token may be periodically refreshed. For example, the identity token of the anonymous identifier token may be periodically refreshed without having to refresh other data and/or tokens associated with the user.

Figure 6:
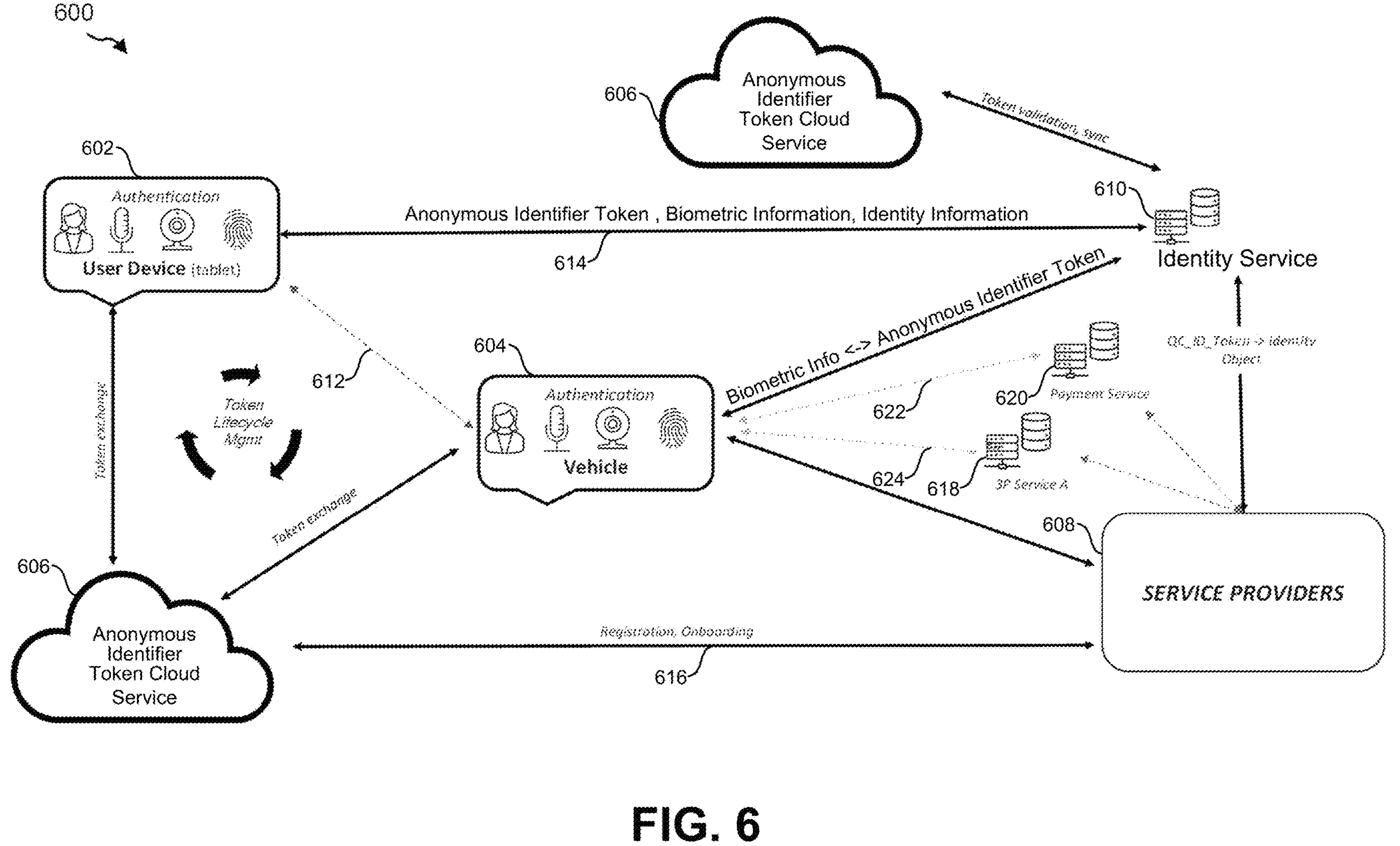
FIG. 6 is a block diagram illustrating an anonymous identifier token system, in accordance with aspects of the present disclosure.

FIG. 6 is a block diagram illustrating an anonymous identifier token system 600, in accordance with aspects of the present disclosure. In some examples, the anonymous identifier token system 600 may include a user device 602, a vehicle 604, cloud services 606, and service providers 608. In some cases, the anonymous identifier token system 600 may also include an identity service 610. Initially, users of the anonymous identifier token system 600 may register with the system using a registration process.

In some examples, registration may be performed by devices accessible to a user, such as the user device 602 and/or vehicle 604. In some cases, the user device 602 may be similar to user device 507 of FIG. 5. Registration may create an anonymous identifier token that may be associated with the user. In some cases, during the registration process, a user may provide information sufficient to authenticate the user. For example, an account may be created by the user and an authentication process to access the account may be used to access the anonymous identifier token system 600. The registration may be performed, for example, by an application executing on and/or a system accessible by (e.g., a web page, web application, cloud services 606, etc.) the user device 602 and/or vehicle 604. In some cases, the account may be accessed based on biometric information of the user (e.g., obtained by a biometric sensor). The biometric information may be a measurement of a physiological characteristic of the user. In other cases, the account may be access based on non-biometric information, such as via a username/password, passwordless authentication, multi-factor authentication, and the like. In some cases, the user may be authenticated to access the account based on the biometric or non-biometric information.

In some cases, a user may be authenticated, for example, by a biometric or other authentication service. This authentication service may look up an anonymous identifier token associated with an authenticated user. The authentication service may generate an authentication token. This authentication token may be a string of characters that may be used to authenticate a user, but the authentication token does not directly convey an identity of the user. The authentication token may be incorporated into the anonymous identifier token assigned to the user. The authentication token may be used to indicate authentication information associated with the user. The anonymous identifier token may include an identity token which represents the user.

In some cases, registration and generating the anonymous identifier token, including the identity token, may be performed by the user device 602 and/or vehicle 604 in conjunction with anonymous identifier token cloud service 606. In some cases, the anonymous identifier token may be synchronized with and/or stored on the cloud services. For example, the anonymous identifier token may be generated by the user device 602 and then synchronized with the vehicle 604 via the anonymous identifier token cloud service 606. Additionally, any changes made to the anonymous identifier token, for example by the vehicle 604 may be synchronized back to the user device 602. The anonymous identifier token may also be shared between the user device 602 and the vehicle 604 via a direct connection 612. The direct connection 612 may be any D2D RAT, such as LTE Direct (LTE-D), Wi-Fi Direct (Wi-Fi-D), Bluetooth®, NFC, and so on. In some cases, a vehicle token may also be shared between the user device 602 and the vehicle 604 via a direct connection 612 or synchronized by the anonymous identifier token.

In some cases, if a user associated with an anonymous identifier token is authorized to use a vehicle 604 (e.g., owns the vehicle, rents/borrows the vehicle, etc.) the anonymous identifier token may include a vehicle token associated with vehicle 604. The vehicle token may also include vehicle information, such as a vehicle identifier, associating the anonymous identifier token with a particular vehicle. In some cases, the anonymous identifier token may be updated to include the vehicle token when the user is authorized to access the vehicle 604. This authorization may be performed, for example, via an application on the user device 602, the vehicle 604 and/or via cloud services 606 accessible via any device. In some cases, the anonymous identifier token cloud service 606 may synchronize the anonymous identifier token including the vehicle token as between the user device 602 and the vehicle 604, for example, when the user is authorized to use the vehicle 604. In some cases, to access the vehicle 604, the user device 602 may pass the anonymous identifier token (including the vehicle token) to the vehicle, for example, via the direct connection 612 and/or anonymous identifier token cloud service 606 and the vehicle 604 may verify the vehicle token by comparing information in the vehicle token from the received anonymous identifier token to information stored on the vehicle 604, such as a stored vehicle token. In some cases, the vehicle 604 may also compare the received anonymous identifier token with an anonymous identifier token(s) associated with the vehicle 604 (e.g., stored on the vehicle 604). In other cases, the vehicle 604 may receive biometric information (e.g., via a biometric sensor) and the vehicle may authenticate a user via the biometric information. The vehicle may also retrieve a stored anonymous identifier token based on the authentication via the biometric information (or non-biometric information). In some cases, the vehicle token may also include (or be associated with) personalization information (e.g., seat position, climate control settings, preferred music, permitted operating hours, etc.) for the associated user for the vehicle 604, and the vehicle 604 may retrieve the personalization information from the vehicle token.

In some cases, if a user associated with an anonymous identifier token is authorized to use a vehicle 604 (e.g., owns the vehicle, rents/borrows the vehicle, etc.) the anonymous identifier token may also include vehicle information, such as a vehicle identifier, associating the anonymous identifier token with a particular vehicle. In some cases, the anonymous identifier token may be updated with a vehicle identifier when the user is authorized to access the vehicle 604. This authorization may be performed, for example, via an application on the user device 602, the vehicle 604 and/or via cloud services 606 accessible via any device. In some cases, the anonymous identifier token cloud service 606 may synchronize the anonymous identifier token as between the user device 602 and the vehicle 604, for example, when the user is authorized to use the vehicle 604. In some cases, to access the vehicle 604, the user device 602 may pass the anonymous identifier token to the vehicle, for example, via the direct connection 612 and/or anonymous identifier token cloud service 606 and the vehicle 604 may compare a received anonymous identifier token with anonymous identifier token(s) associated with the vehicle 604 (e.g., stored on the vehicle 604). In other cases, the vehicle 604 may receive biometric information (e.g., via a biometric sensor) and the vehicle may authenticate a user via the biometric information. The vehicle may also retrieve a stored anonymous identifier token based on the authentication via the biometric information (or non-biometric information). In some cases, the anonymous identifier token may also include personalization information (e.g., seat position, climate control settings, preferred music, etc.) for the associated user for the vehicle 604, and the vehicle 604 may retrieve the personalization information from the anonymous identifier token.

In some cases, the biometric information obtained by a first device, such as the user device 402, may be difficult to correlate with biometric information obtained by a second device, such as vehicle 604. In some cases, an identity service 610 may be used to correlate biometric information across devices. For example, as a part of registration, if an identity service 610 is being used, the user device 602 (or vehicle 604 if registration is being performed there) may pass the anonymous identifier token along with biometric information and identity information 614. In some cases, biometric information from multiple biometric sensors may be passed to the identity service 610 for storage. If the user then attempts to access the vehicle 604 via a biometric sensor, the vehicle 604 may pass biometric information from the biometric sensor to identity service 610. The identity service 610 may then match the biometric information to stored biometric information to retrieve the anonymous identifier token for the user. In some cases, the retrieved anonymous identifier token may then be passed back to the vehicle 604. The vehicle 604 may then check the anonymous identifier token from the identity service 610 to verify that the anonymous identifier token (e.g., identity token of the anonymous identifier token) matches identity token(s) of anonymous identifier token(s) associated with the vehicle.

In some cases, the anonymous identifier token may be used to obtain services. For example, service providers 608 may register with the anonymous identifier token cloud service 606 to use anonymous identifier tokens during an onboarding process 616 for the service providers 608. In some cases, during the onboarding process 616, the service providers 608 may indicate to the anonymous identifier token cloud service 606 what transaction data may be provided for services that may be provided by the service providers 608. For example, a service token may include information about an account associated with the service, loyalty information, discount codes, etc. In some cases, such as for a vehicle fleet operator, vehicle rental service, etc., the service token may include vehicle authorization information that may be used by the vehicle 604. The anonymous identifier token cloud service 606 may provide a corresponding indication to the user device 602 and/or vehicle 604 of what transaction data may be provided for services by a service provider. For example, for a user associated with the service, the anonymous identifier token cloud service 606 may synchronize the service token to the user device 602 and/or vehicle 604.

In some cases, the anonymous identifier token may be used to provide payment for services. For example, the user device 602 (or vehicle 604) may be associated with one or more payment services. A first payment service 620 associated with the user device 602 may provide 622 the user device 602 with a payment token that may be used to process payments with the first payment service 620. Another service, Service A 618, of the service providers 608 may accept payment via the first payment service 620 and may indicate to the anonymous identifier token cloud service 606 that it accepts payments via the first payment service 620. The anonymous identifier token cloud service 606 may indicate to the vehicle 604 and/or the user device 602 that Service A 618 accepts payments via the first payment service 620. Thus, if the vehicle 604 attempts to pay for a service provided by Service A 618, the vehicle 604 may provide 624 an anonymous identifier token with an identity token associated with a user of the vehicle 604 and the payment token associated with the first payment service 620. Service A 618 may then process the payment based on the payment token. In some cases, a service provider 608 may also verify, for example, the identity token of an anonymous identifier token with the identity service 610 and/or anonymous identifier token cloud service 606. In some cases, if the Service A 618 uses a service token, the vehicle 604 may receive and provide the service token in a manner similar to how the payment token was provided. For example, if Service A 618 is associated with a service token for a loyalty card, Service A 618 may have established the association with the service token as a part of the onboarding process 616 and the vehicle 604 may receive an indication (e.g., from the user or service A 618) to provide the service token as a part of the anonymous identifier token. In some cases, the user device 602 and/or vehicle 604 may use the anonymous identifier token to access services independent of another device (e.g., another user device 602 and/or vehicle 604).

In some cases, multiple users may use the same vehicle concurrently. In such cases, the anonymous identifier token for each user may be accessed by a service associated the users from devices associated with the vehicle 604 in their vicinity. For example, a passenger sitting in the rear seat of the vehicle 604 can access the services (and exchanged token information with) associated with the passenger's anonymous identifier token via a rear seat display while a driver may access services associated with the driver's anonymous identifier token in an HMI accessible to the driver. In some cases, multiple users in a car may allow their services to be merged by allowing the data from anonymous identifier tokens to be merged. For example, two users in a vehicle can play a merged playlist of music from the music personalization token that may be stored in anonymous identifier token representing each user.

In some cases, the anonymous identifier token provided by the user device 602 and/or vehicle 604 to a service provider 608 may be a curated anonymous token, which may include subset of the information that may be available in an anonymous identifier token stored on a user device, vehicle (e.g., in an anonymous identifier token engine), and/or anonymous identifier token cloud service. For example, the anonymous identifier token for a user stored on the vehicle 604 (or user device 602 and/or cloud service 606) may include multiple service specific tokens and personalization information for the vehicle. However, the curated anonymous token provided 624 to Service A 618 may include a single service token and may not include the vehicle personalization information or service tokens associated with other services. The information provided in the curated anonymous token sent to a service provider 608 may be based on, for example, an information policy.

The information policy may be a policy indicating what data may be provided to what parties and the information policy may be established based on, for example, user preferences/indications, information requested by the service provider(s), information determined to be appropriate for a party, and the like. For example, certain information policies may indicate which parties may access certain information. In some cases, information policies for certain parties, such as a service provider 810, may be established, for example as a part of the onboarding process 616 and/or during updates as between the service provider 608 and the anonymous identifier token cloud service 606. As discussed above, the vehicle personalization information may be subject to an information policy which limits such information to the user device 602, anonymous identifier token cloud service 606, and the vehicle 604. As another example, an information policy, information requested by the service provider (e.g., an indication of what payment services the service provider accepts), and/or a user preference/indication (e.g., an indication to use a certain payment system and/or hierarchical preference list of payment systems) may cause the vehicle 604 to include a payment token associated with the first payment service 620, rather than another payment token associated with a second payment service (not shown) in the curated anonymous token.

Based on the information policy certain data appropriate for a particular service provider may be extracted from the stored anonymous identifier token and provided to the service provider in a curated anonymous token for the service provider. In some cases, the information about applicable information policies, user preferences/indications, or any other information that may be used to personalize services may also be included in the stored anonymous identifier token. In some cases, the curated anonymous token may be provided to certain user devices. For example, certain user devices, such as a smartwatch, may have limited storage, memory, processing/encrypting capabilities, and/or other capabilities, and the curated anonymous token provided for such user devices may be limited based on, for example, the capabilities of the specific user device.

Figure 7:
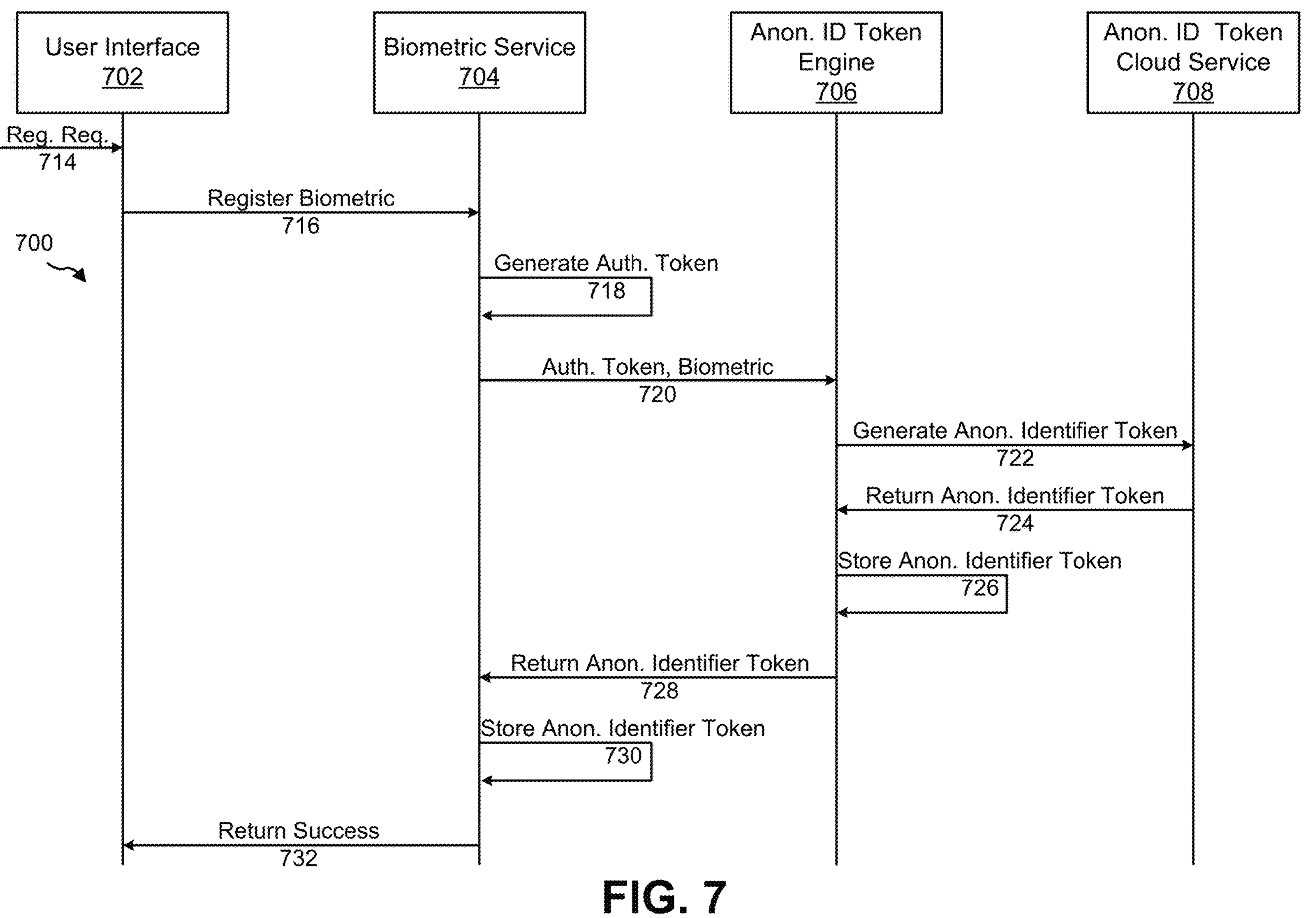
FIG. 7 is a call flow diagram illustrating a registration process for an anonymous identifier token system, in accordance with aspects of the present disclosure.

FIG. 7 is a call flow diagram illustrating a registration process 700 for an anonymous identifier token system, in accordance with aspects of the present disclosure. In some cases, the registration process 700 may include signaling between a user interface 702, a biometric service 704, an anonymous identifier token engine 706, and an anonymous identifier token cloud service 708. In some cases, the user interface 702 may be a user facing interface for the anonymous identifier token system, such as an application executing on a device (e.g., user device 602, vehicle 604, and the like), a web-based interface (e.g., web page, web applications, etc.), networked application, and the like. In some cases, the user interface 702 may include one or more input devices, such as a touchscreen, biometric sensor, keyboard, pointing device, etc., along with an output device, such as a display. In some cases, the biometric service 704 may be executing (at least in part) on the device hosting the user interface 702. The biometric service 704 may authenticate a user based on one or more physical characteristics of the user and may include one or more biometric sensors. In some cases, the biometric service 704 may include web based (e.g., cloud, server, etc.) components, such as discussed above with respect to the identity service 610 of FIG. 6. The anonymous identifier token engine 706 may execute on the vehicle and/or user device, and the anonymous identifier token engine 706 may communicate and/or exchange data with an anonymous identifier token cloud service 708 via a network connection. The anonymous identifier token cloud service 708 may be a web based service accessible via the network connection. The anonymous identifier token engine 706 and anonymous identifier token cloud service 708 may generate and provide operations for accessing and storing data in the anonymous identifier token.

In the registration process 700, the user interface 702 (e.g., of the vehicle and/or user device) may receive a registration request 714 to register a user with the anonymous identifier token system. In some cases, the registration request 714 may include information about the user. The user interface 702 may call 716 the biometric service 704 to register biometric information for the user. The biometric service 704 may obtain biometric information about the user, for example, via a biometric sensor and generate 718 an authentication token based on the biometric data. For example, the authentication token may be provided when a user is successfully authenticated based on biometric information and the biometric service 704 may map biometric information for users to authentication tokens. In some cases, non-biometric information for authenticating the user may be used instead of biometric information. For example, a username/password may be registered and an authentication token may be generated based on a correct username/password authentication.

In some cases, the authentication token may be used by another device to authenticate the user. For example, a user may register for the anonymous identifier token system on a user device and create an anonymous identifier token including the authentication token and identity token. This anonymous identifier token may be synchronized to a vehicle associated with the user (e.g., via a direct connection or via a server). The user may then be able to biometrically authenticate with and access service providers via the vehicle without having to separately register biometric information with the vehicle.

The authentication token may be sent 720 from the biometric service 704 to the anonymous identifier token engine 706 to invoke generation of an anonymous identifier token. In some cases, information about the user may also be passed to the anonymous identifier token engine 706, either via the user interface 702 or the biometric service 704 for generating 720 the anonymous identifier token. For example, the biometric service 704 may send 720 biometric information along with the authentication token to the anonymous identifier token engine 706. In some cases, the anonymous identifier token engine 706 may transmit information about the user to the anonymous identifier token cloud service 708 to generate 722 the anonymous identifier token. In some cases, the anonymous identifier token engine 706 may use a create-read-update-delete service of the anonymous identifier token cloud service 708 to generate 722 the anonymous identifier token. The anonymous identifier token cloud service 708 may generate the anonymous identifier token. The anonymous identifier token may include an identifier token for identifying the user that may be generated based on the information about the user, but the anonymous identifier token may not include the information about the user sufficient to directly identify the user. In some cases, the anonymous identifier token may also include one or more tokens that may be used by service providers. The anonymous identifier token may also include data regarding the user and/or vehicle associated with the user (e.g., personalization data, vehicle information, etc.).

The anonymous identifier token cloud service 708 may then return 724 the anonymous identifier token to the anonymous identifier token engine 706. The anonymous identifier token engine 706 may add the authentication token to the returned anonymous identifier token. The anonymous identifier token engine 706 may store 726 the returned anonymous identifier token and authentication token. In some cases, the anonymous identifier token may be stored on a device in a trusted execution environment (TEE). In some cases, the TEE can be implemented as a secure area of a processor that can be used to process and store sensitive data in an environment that is segregated from the rich execution environment in which the operating system and/or applications may be executed. In some examples, the anonymous identifier token engine 706 may pass the authentication token to the anonymous identifier token cloud service 708 as a part of generating 722 the anonymous identifier token. The anonymous identifier token engine 706 may return 728 the anonymous identifier token to the biometric service 704. In some cases, the anonymous identifier token engine 706 may return 728 a curated anonymous token to the biometric service 704. The returned 728 anonymous identifier token (or curated anonymous token) may include the identifier token, which may be encrypted. The biometric service 704 may associate the authentication token with the anonymous identifier token (or curated anonymous token) and store 730 the anonymous identifier token (or curated anonymous token) along with the associated authentication token. In some cases, the authentication token in the anonymous identifier token (or curated anonymous token) may be encrypted and not accessible by the biometric service 704. An indication that the registration succeeded may then be returned 732 to the user interface 702.

Figure 8:
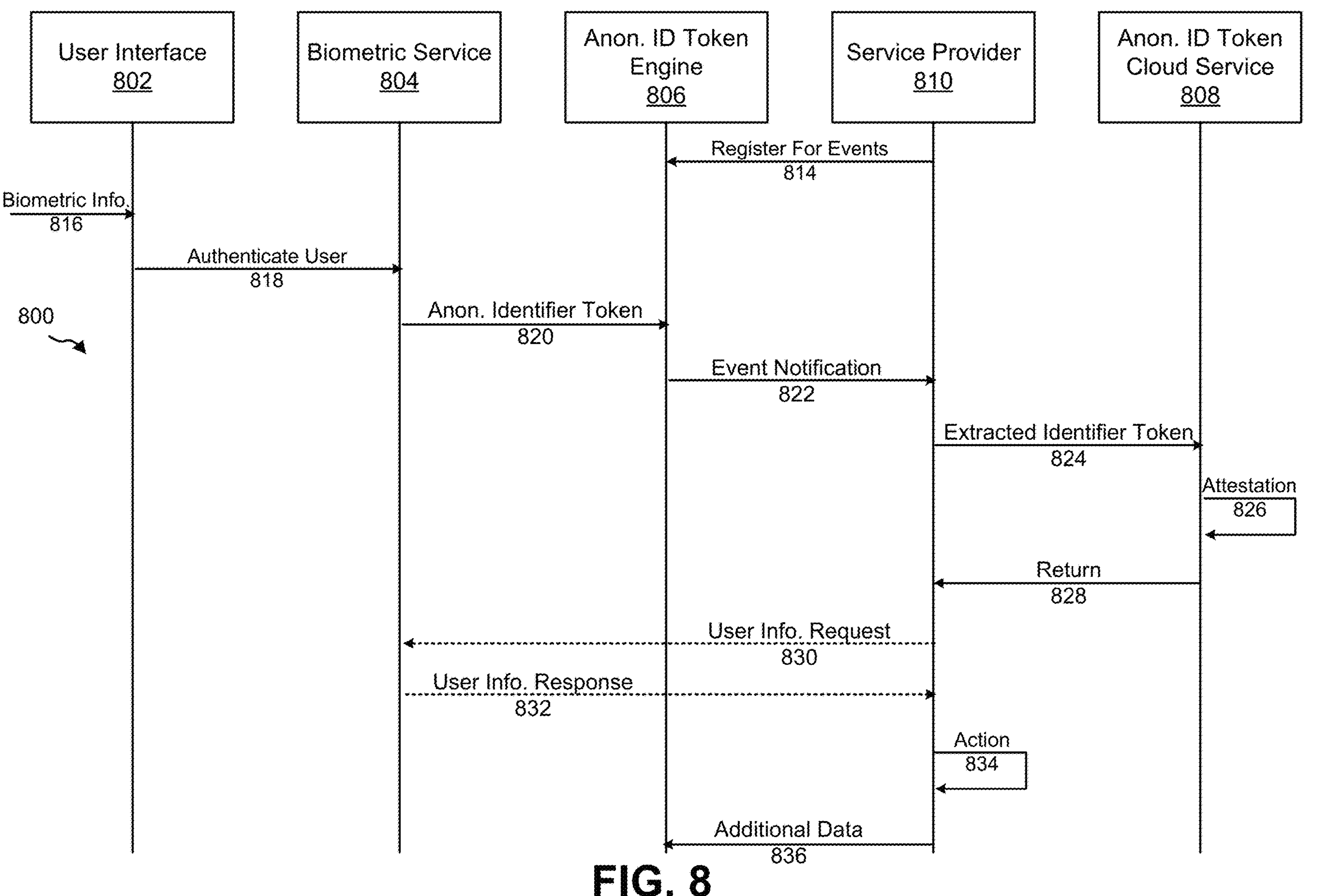
FIG. 8 is a call flow diagram illustrating an authentication process for a user of a vehicle using an anonymous identifier token system, in accordance with aspects of the present disclosure.

FIG. 8 is a call flow diagram illustrating an authentication process 800 for a user of a vehicle using an anonymous identifier token system, in accordance with aspects of the present disclosure. In some cases, the authentication process 800 for a vehicle may include signaling between a user interface 802, a biometric service 804, an anonymous identifier token engine 806, an anonymous identifier token cloud service 808, and a service provider 810. In some cases, the user interface 802, biometric service 804, anonymous identifier token engine 806, and anonymous identifier token cloud service 808 may be similar to those described above with respect to FIGS. 6-7. The service provider 810 may be similar to the service providers 608 and/or Service A 618 as discussed above with respect to FIG. 6. In some cases, the service provider 810 may be one of any number of service providers that may participate in the anonymous identifier token system, such as anonymous identifier token system 600 of FIG. 6.

In the authentication process 800, the service provider 810 may register for identity events 814 associated with the user with the anonymous identifier token engine 806. The registration for events 814 may include an application identifier associated with the service provider 810 and the registration for events 814 may allow the service provider 810 to be notified (e.g., via a pushed/pulled event, notification, application programming interface, etc.) when a user is attempting to access the service provider 810 through the anonymous identifier token system, or a certain action happens, such as starting an application associated with the service provider. In some cases, the application identifier may be a unique identifier assigned to the service provider 810 when the service provider 810 was onboarded (e.g., registers during an onboarding process, such as onboarding process 616 of FIG. 6) with the anonymous identifier token system. In some cases, the registration for events 814 may be performed between the service provider 810 and the anonymous identifier token cloud service 808, and the anonymous identifier token cloud service 808 may synchronize registered events to the anonymous identifier token engine 806 of a vehicle and/or user device. Registering for events 814 may establish a channel by which the service provider 810 may be notified in case a registered event occurs. In some cases, the anonymous identifier token engine 806 may execute on the vehicle and/or user device, and the anonymous identifier token engine 806 may communicate and/or exchange data with an anonymous identifier token cloud service 808.

In the authentication process 800 for the user, the user interface may receive biometric information 816 (or other authentication information, such as a username/password) from a user of the vehicle. For example, the user may utilize a biometric sensor to authenticate the user. In some cases, the user may use a biometric sensor to access aspects of the vehicle (e.g., unlock, turn-on, access certain services, etc.). The biometric information may be provided to the biometric service 804 to authenticate the user 818 via the user interface 802. The biometric service 804 may authenticate 818 the user based on the biometric information. As discussed above with respect to FIG. 7, the biometric service 804 may have stored an anonymous identifier token (or curated anonymous token) for the user and the biometric service 804 may retrieve the anonymous identifier token (or curated anonymous token) and/or the authentication token associated with the biometric information of the user. In some cases, a non-biometric authentication system/service may be used in place of, or in addition to, the biometric service 804 to retrieve the anonymous identifier token (or curated anonymous token) and/or the authentication token. The biometric service 804 may transmit 820 the anonymous identifier token (or curated anonymous token) and/or the authentication token to the anonymous identifier token engine 806.

The anonymous identifier token engine 806 may receive the anonymous identifier token (or curated anonymous token) and/or an authentication token and the anonymous identifier token engine 806 may retrieve a stored anonymous identifier token based on the received anonymous identifier token (or curated anonymous token) and/or authentication token. In some cases, the anonymous identifier token engine 806 may determine what information from the stored anonymous identifier token may be provided to the service provider 810, for example, based on the information policy associated with the anonymous identifier token. In some cases, the information policy may be obtained from the anonymous identifier token. The anonymous identifier token engine 806 may extract the determined information that may be provided to the service provider 810 into a curated anonymous token. In some cases, the curated anonymous token may include the identifier token and the identifier token included in the curated anonymous token may be encrypted. In some examples, the curated anonymous token may also include, for example, service provider 810 specific tokens. In some cases, if registered event 814 by the service provider 810 occurs (e.g., the user loads an application associated with the service provider 810, attempts to access the service provider, etc.), a notification of the event 822 may be published (e.g., pushed/pulled) on the channel established when the service provider 810 registered for events 814. For example, the curated anonymous token may be provided on the channel to the service provider 810 by the anonymous identifier token engine 806.

After the curated anonymous token is received by the service provider 810, the service provider 810 may extract the identifier token from the curated anonymous token. If the identifier token is encrypted, the service provider 810 may transmit 824 the identifier token (or curated anonymous token) to the anonymous identifier token cloud service 808. The anonymous identifier token cloud service 808 may verify the encrypted identifier token and attest 826 that the encrypted identifier token is a valid identifier token. In some cases, if the service provider 810 is permitted (e.g., based on the information policy) to access the identifier token, the anonymous identifier token cloud service 808 may return 828 the decrypted identifier token (or a curated anonymous token with the decrypted identifier token). In some cases, the anonymous identifier token cloud service 808 may return 828 an indication that the identifier token is valid. In some examples, the anonymous identifier token cloud service 808 may return 828 other metadata (e.g., a service provider token, personalization data, etc.) in a curated anonymous token to the service provider 810.

In some cases, the service provider 810 may request additional user information 830, for example, from the biometric service 804 and/or anonymous identifier token engine 806. This user information may be, for example, information for providing the service, such as shipping information for the user, vehicle information (e.g., color/make/model to deliver food to), payment token, and the like. The request for additional user information 830 may include the curated anonymous token. The biometric service 804 and/or anonymous identifier token engine 806 may respond with the requested user information 832. In some cases, the requested user information may be included in a curated anonymous token.

Based on the requested user information 832, or information provided in the return 828 from the anonymous identifier token cloud service 808, the service provider 810 may take some action (e.g., process payment, provide service, etc.) 834. In some cases, the service provider may provide additional data (e.g., metadata, service provider token, personalization information, etc.) 836 to the anonymous identifier token engine 806. This provided additional data 836 may be provided as a curated anonymous token. This provided additional data 836 may be received by the anonymous identifier token engine 806 and stored, for example, in the stored anonymous identifier token.

Figure 9:
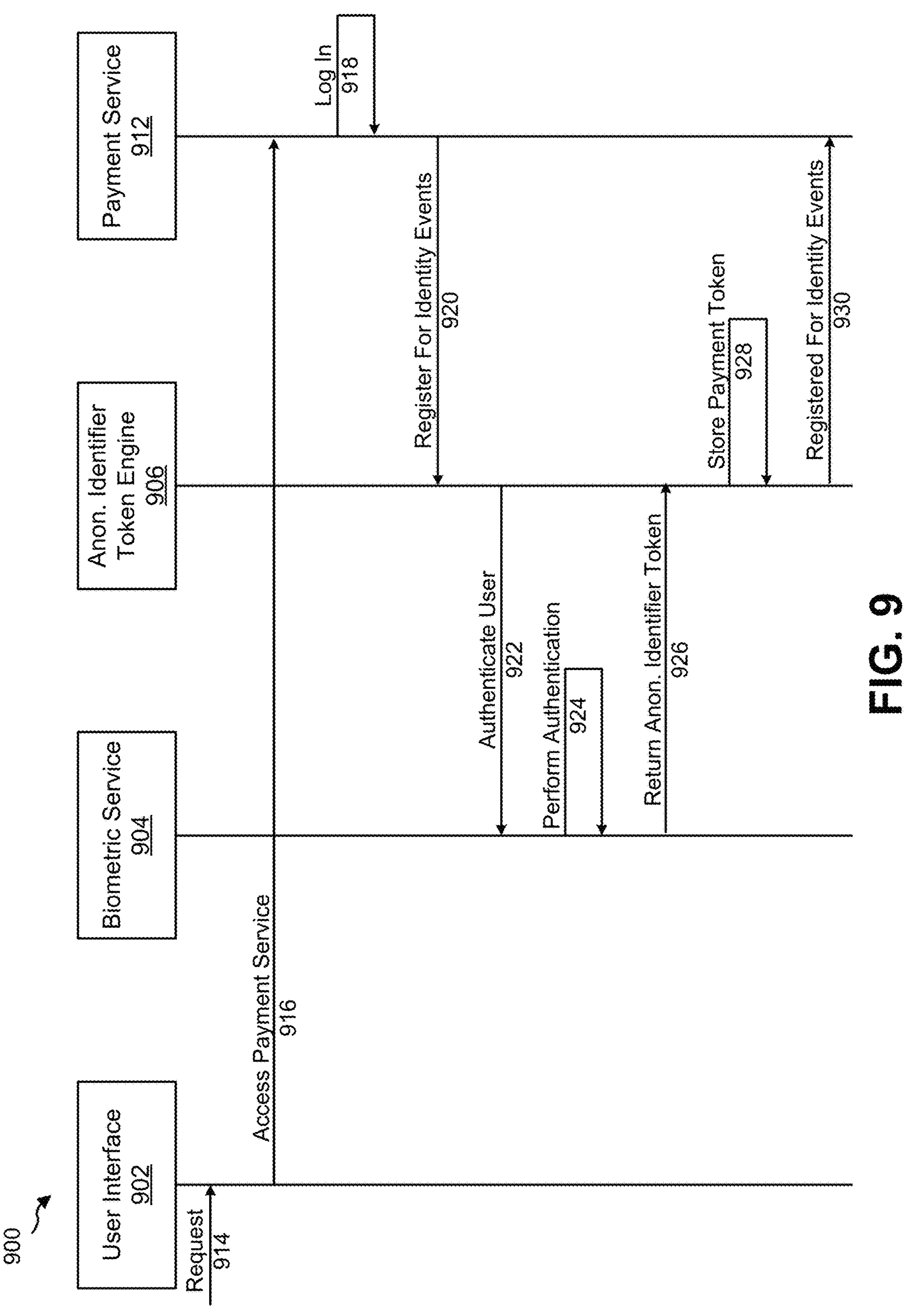
FIG. 9 is a call flow diagram illustrating a payment service registration process for a vehicle using an anonymous identifier token system, in accordance with aspects of the present disclosure.

FIG. 9 is a call flow diagram illustrating a payment service registration process 900 for a vehicle using an anonymous identifier token system, in accordance with aspects of the present disclosure. In some cases, the payment service registration process 900 for the vehicle may include signaling between a user interface 902, a biometric service 904, an anonymous identifier token engine 906, and a payment service 912. In some cases, the user interface 902, biometric service 904, and anonymous identifier token engine 906, may be similar to those described above with respect to FIGS. 6-7. The payment service 912 may be similar to the first payment service 620 and second payment service (not shown) discussed with respect to FIG. 6. In some cases, the payment service 912 may be one of any number of payment services that may participate in the anonymous identifier token system, such as anonymous identifier token system 600 of FIG. 6.

In the payment service registration process 900 for the vehicle, the user interface 902 of a vehicle may receive a request 914 to register a payments service with a vehicle for paying services. The request 914 may be associated with a user of the vehicle. For example, the user of the vehicle may attempt to access the payment service 912 to register the payment service. In some cases, the user interface 902 of the vehicle may attempt to access 916 the payment service 912 based on the request 914. For example, the vehicle may allow a user to access 916 a web page and/or application associated with the payment service via the user interface 902. In some cases, the user may log in 918 to the payment service 912. In some cases, the user may also create an account with and/or wallet, provide personal and/or payment information, etc., to the payment service 912.

Once logged in, the payment service 912 may register for identity events 920 associated with the user with the anonymous identifier token engine 906. The registration for identity events 920 may include an application identifier associated with the payment service 912, along with a payment token for the user. In some cases, the application identifier may be a unique identifier assigned to a service provider, such as the payment service 912, when the service provider was onboarded (e.g., registers during an onboarding process, such as onboarding process 616 of FIG. 6) with the anonymous identifier token system. In some cases, the anonymous identifier token engine 906 may be executing on the vehicle and/or user device, and the anonymous identifier token engine 906 may communicate and/or exchange data with an anonymous identifier token cloud service.

In some examples, to verify the user of the vehicle (and in some cases, associate the user with the vehicle) the anonymous identifier token engine 906 may call 922 the biometric service 904 (or non-biometric service) to authenticate 924 the user of the vehicle. The biometric service 904 may then biometrically authenticate 924 the user of the vehicle. Alternatively, a non-biometric based service may authenticate the user. In cases where the user is already registered with the biometric service 904, an anonymous identifier token for the user may be retrieved based on the authentication 924 of the user and the anonymous identifier token (or an indication of the anonymous identifier token) may be returned 926 to the anonymous identifier token engine 906. In cases where the user is not registered with the biometric service 904, a registration process, such as registration process 700 of FIG. 7, may be performed to create an anonymous identifier token for the user and this created anonymous identifier token may be returned 926 to the anonymous identifier token engine 906.

The anonymous identifier token engine 906 may then store 928 the payment token received as a part of registering for identity events 920 from the payment service 912 in the anonymous identifier token for the user. In some cases, the anonymous identifier token may be stored on a device in a TEE. In cases where the payment token is stored in the anonymous identifier token by the anonymous identifier token cloud service, the anonymous identifier token may be synchronized with the vehicle and/or user device. Similarly, if the payment token is stored in the anonymous identifier token by the vehicle/user device, the anonymous identifier token may be synchronized with the anonymous identifier token cloud service. The anonymous identifier token engine 906 may send 930 an indication that payment service 912 successfully registered for identity events to the payment service 912. In some cases, the indication of successful registration may be sent as an event. In some cases, the event may be either pushed by the anonymous identifier token engine 906, pulled by the payment service 912, or otherwise provided on a channel for such events.

Figure 10:
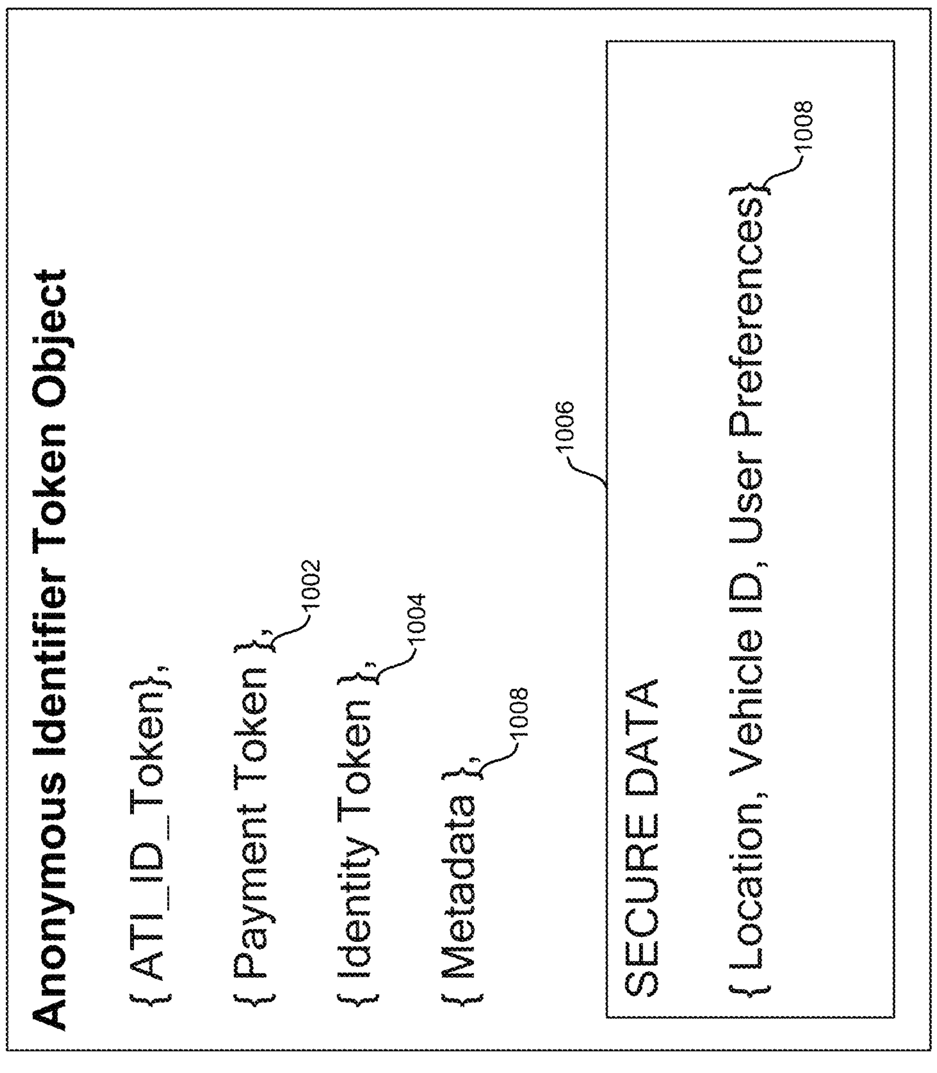
FIG. 10 is a flow diagram of a process for authentication, in accordance with aspects of the present disclosure.
Figure 10:
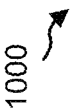

FIG. 10 is a block diagram of an anonymous identifier token 1000, in accordance with aspects of the present disclosure. As shown, the anonymous identifier token represents an (anonymous) identity and associated device. In some cases, the anonymous identifier token 1000, on a device can be associated with other tokens and these tokens may be stored in secure structures (anonymous identifier token object). For example, the anonymous identifier token 1000 includes a payment token 1002 and an identity token 1004. In some cases, the anonymous identifier token may include secure data 1006 that that may be encrypted. In some cases, an anonymous identifier token blockchain may also be exchanged between devices. The anonymous identifier token blockchain may be stored in the secure data 1006 area. In some cases, the storage associated with the anonymous identifier token is not limited to other service tokens but extendable to any data (e.g., metadata 1008 associated with vehicle (such as location) and user (such as preferences)). In some cases, this metadata 1008 may be stored in the secure data 1006 area or not.

FIG. 11 is a block diagram of a technique 1100 for using an anonymous identifier token, in accordance with aspects of the present disclosure. In some cases, a user in a vehicle can order from an HMI (either in drive-through) or ahead of time/on the way. When user submits the order, along with the order, an anonymous identifier token may be submitted which contains ($ amount to be paid, location and other details, such as authentication info, biometric, etc.). The POS submits the anonymous identifier token to the payment processor and confirms the charge/payment. Confirmation may be sent to the HMI. The user may then pick up the order from the pickup window.

In some cases, authentication mechanism such as OAuth or other mechanisms are used to redirect users to social media websites from another website. These mechanisms can also be used to directly call APIs from social media services (for example getting user preferences from Yelp). These mechanisms use tokens (e.g. OAuth tokens). These tokens can be stored in an anonymous identifier token to provide further personalization of user actions on a device. For example, a person searching for restaurants nearby can be automatically logged into their Yelp account to provide personalized results.

In some cases, the EV charging ecosystem is moving to make charging easier for customers by introducing a concept called PlugNCharge (PnC). This mechanism allows an automaker to work with ecosystem partners such as charge point operators (CPOs) to provide a contract between a vehicle and the OEM. The contract is attached to a credit card on file for the owner of the vehicle. At the charging station, this contract (represented by a certificate) can be exchanged between the vehicle and the charging station via the charging cable (which is capable for data exchange) so the credit card on file associated with the contract can be used for the EV charging session. Current PnC mechanism only allows for one user/vehicle combination for the contract. This means that one person cannot use their my contract for another person's vehicle. Anonymous identifier tokens can help personalize this as well by storing a contract certificate for each user that wants to use the car. A first person may be able to temporarily authorize a second person to use their car whereby the first person's ID token along with contract certificate can be enabled in the second person's car.

Figure 12:
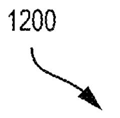
FIG. 12 is a block diagram of an anonymous identifier token, in accordance with aspects of the present disclosure.
Figure 12:
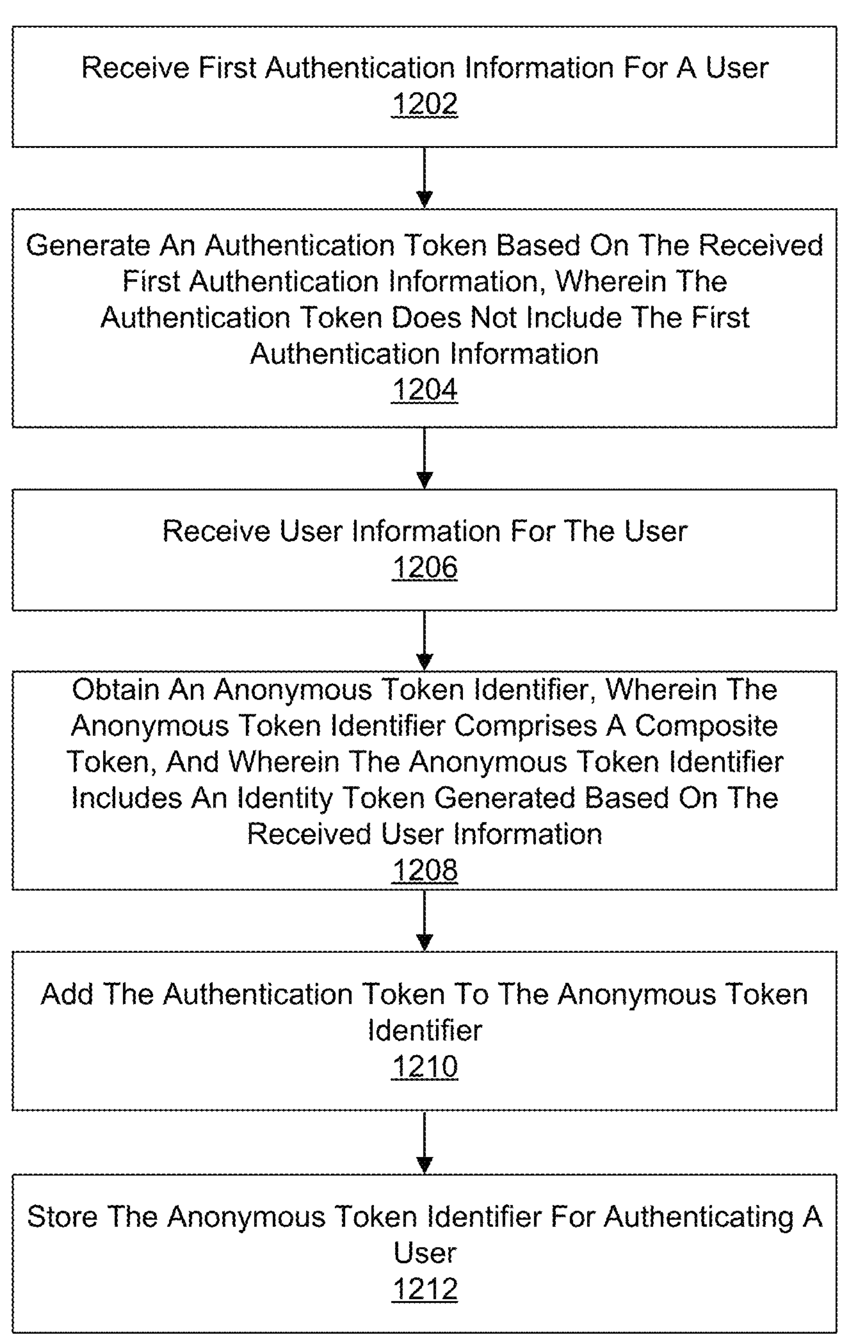

FIG. 12 is a flow diagram of a process 1200 for threat reporting for a wireless device, in accordance with aspects of the present disclosure. The process 1200 may be performed by a computing device (or apparatus) or a component (e.g., a chipset, codec, etc.) of the computing device. The computing device may be a mobile device (e.g., a user device), a UE (e.g., UE 104 of FIG. 1, UE 221 of FIG. 2, user device 507 of FIG. 5, user device 602 of FIG. 6, etc.), a vehicle (e.g., vehicle 304 of FIG. 3, vehicle 404 of FIG. 4, and/or vehicle 604 of FIG. 6) or component or system of a vehicle, or other type of computing device. The operations of the process 1200 may be implemented as software components that are executed and run on one or more processors (e.g., processor 584 of FIG. 5, and/or processor 1310 of FIG. 13). In some cases, the operations of the process 1200 can be implemented by a system having the architecture if the computing system 1300 of FIG. 13.

At block 1202, the computing device (or component thereof) may receive first authentication information for a user. In some cases, the first authentication information comprises biometric information. In some cases, the computing device (or component thereof) may receive a request to register for an event from a service provider. In some cases, the computing device (or component thereof) may establish a channel for notifying the service provider of an occurrence of the event. In some cases, the computing device (or component thereof) may determine that the event has occurred, extract the identity token from the anonymous identifier token, and transmit the identity token to the service provider via the channel. In some cases, the identity token comprises an encrypted identity token for attestation by an anonymous identifier token cloud service. In some cases, the computing device (or component thereof) may receive a request for additional user information from the service provider, extract the requested additional user information from the anonymous identifier token, and transmit the requested additional user information to the service provider. In some cases, the computing device (or component thereof) may receive data from the service provider; and add the data from the service provider to the anonymous identifier token. In some cases, the computing device (or component thereof) may receive a service token associated with the service provider, add the service token to the anonymous identifier token, and transmit the service token to the service provider. In some cases, the service token is received from an anonymous identifier token cloud service. In some cases, the additional user information comprises a payment token.

At block 1204, the computing device (or component thereof) may generate an authentication token based on the received first authentication information, wherein the authentication token does not include the first authentication information.

At block 1206, the computing device (or component thereof) may receive user information for the user. In some cases, the computing device (or component thereof) may receive second authentication information for the user. In some cases, the computing device (or component thereof) may retrieve the anonymous identifier token corresponding to the user based on the received second authentication information.

At block 1208, the computing device (or component thereof) may obtain an anonymous identifier token, wherein the anonymous identifier token comprises a composite token, and wherein the anonymous identifier token includes an identity token generated based on the received user information. In some cases, the computing device (or component thereof) may transmit the anonymous identifier token to another device for authenticating the user based on the authentication token. In some cases, the computing device (or component thereof) may, to obtain the anonymous identifier token, transmit the user information to an anonymous identifier token cloud service. In some cases, the computing device (or component thereof) may, to obtain the anonymous identifier token, receive the anonymous identifier token from the anonymous identifier token cloud service. In some cases, the computing device (or component thereof) may, to obtain the anonymous identifier token, generate the identity token; generate the anonymous identifier token. In some cases, the computing device (or component thereof) may, to obtain the anonymous identifier token, add the identity token to the anonymous identifier token.

At block 1210, the computing device (or component thereof) may add the authentication token to the anonymous identifier token.

At block 1212, the computing device (or component thereof) may store the anonymous identifier token for authenticating a user. In some cases, the computing device (or component thereof) may obtain a vehicle token, the vehicle token associated with a vehicle, and wherein the vehicle token indicates the user has access to the vehicle. In some cases, the computing device (or component thereof) may add the vehicle token to the anonymous identifier token. In some cases, the vehicle token includes vehicle personalization information.

In some examples, the techniques or processes described herein may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 1200 and/or other processes described herein may include a processor, microprocessor, micro-computer, or other component of a device that is configured to carry out the steps of the process 1200 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 1200 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1200 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 1200 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
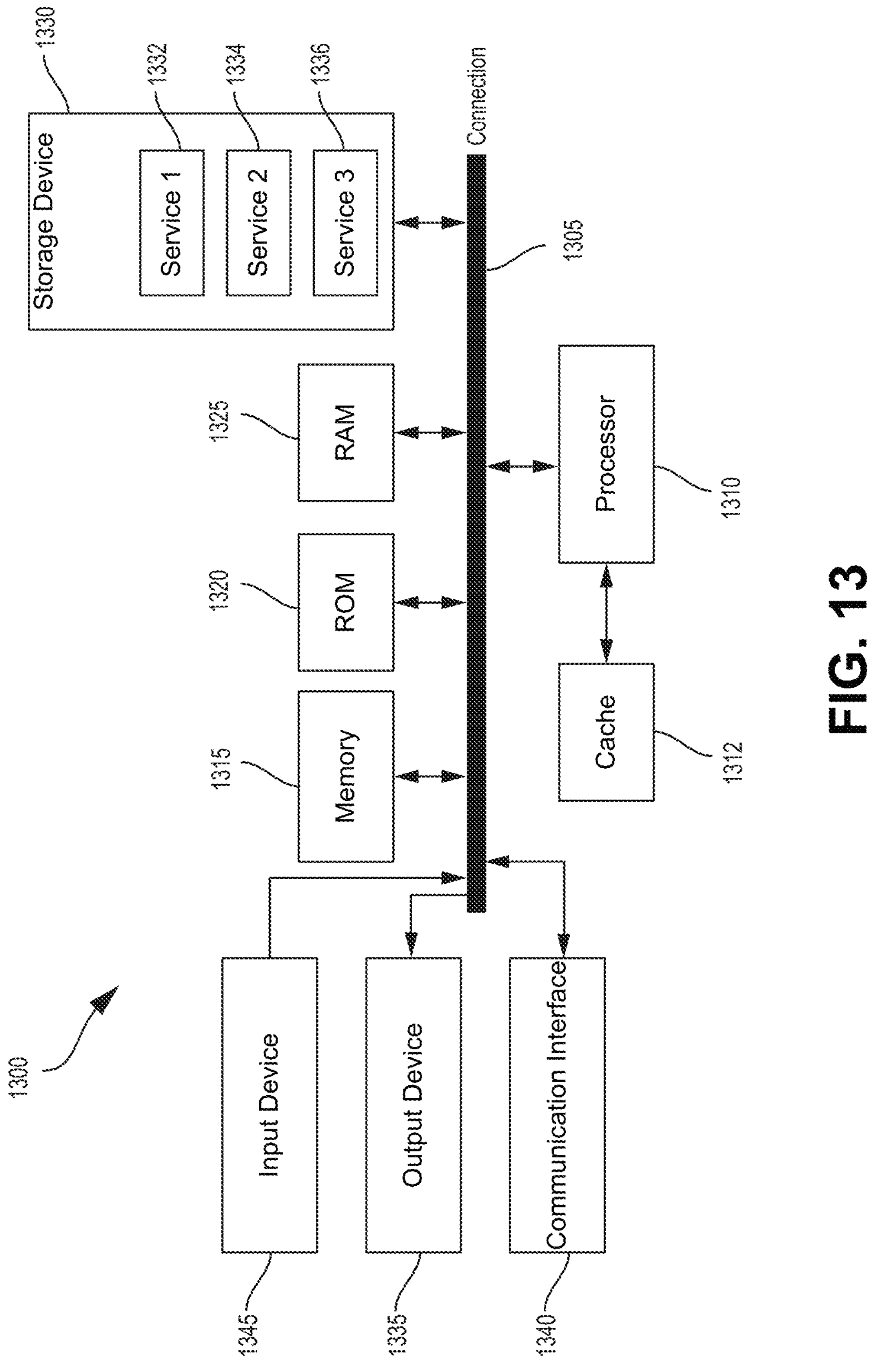
FIG. 13 is a block diagram of a technique for using an anonymous identifier token, in accordance with aspects of the present disclosure.

FIG. 13 is a block diagram illustrating an example of a computing system 1300, which may be employed by the disclosed V2X-sensor misbehavior detection system, in accordance with some aspects of the present disclosure. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection using a bus, or a direct connection into processor 1310, such as in a chipset architecture. Connection 1305 can also be a virtual connection, networked connection, or logical connection.

In some aspects, computing system 1300 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 can include a cache 1312 of high-speed memory connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms. In some instances, multimodal systems can enable a user to provide multiple types of input/output to communicate with computing system 1300.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1340 may also include one or more range sensors (e.g., LIDAR sensors, laser range finders, RF radars, ultrasonic sensors, and infrared (IR) sensors) configured to collect data and provide measurements to processor 1310, whereby processor 1310 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some aspects, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A method for authentication, the method comprising: receiving first authentication information for a user; generating an authentication token based on the received first authentication information, wherein the authentication token does not include the first authentication information; receiving user information for the user; obtaining an anonymous identifier token, wherein the anonymous identifier token comprises a composite token, and wherein the anonymous identifier token includes an identity token generated based on the received user information; adding the authentication token to the anonymous identifier token; and storing the anonymous identifier token for authenticating a user.

Aspect 2. The method of Aspect 1, further comprising: obtaining a vehicle token, the vehicle token associated with a vehicle, and wherein the vehicle token indicates the user has access to the vehicle; adding the vehicle token to the anonymous identifier token.

Aspect 3. The method of Aspect 2, wherein the vehicle token includes vehicle personalization information.

Aspect 4. The method of any of Aspects 1-3, further comprising: receiving second authentication information for the user; and retrieving the anonymous identifier token corresponding to the user based on the received second authentication information.

Aspect 5. The method of any of Aspects 1-4, wherein the first authentication information comprises biometric information.

Aspect 6. The method of any of Aspects 1-5, further comprising transmitting the anonymous identifier token to another device for authenticating the user based on the authentication token.

Aspect 7. The method of any of Aspects 1-6, wherein obtaining the anonymous identifier token comprises: transmitting the user information to an anonymous identifier token cloud service; and receiving the anonymous identifier token from the anonymous identifier token cloud service.

Aspect 8. The method of any of Aspects 1-7, wherein obtaining the anonymous identifier token comprises: generating the identity token; generating the anonymous identifier token; and adding the identity token to the anonymous identifier token.

Aspect 9. The method of any of Aspects 1-8, further comprising: receiving a request to register for an event from a service provider; and establishing a channel for notifying the service provider of an occurrence of the event.

Aspect 10. The method of Aspect 9, further comprising: determining that the event has occurred; extracting the identity token from the anonymous identifier token; and transmitting the identity token to the service provider via the channel.

Aspect 11. The method of Aspect 10, wherein the identity token comprises an encrypted identity token for attestation by an anonymous identifier token cloud service.

Aspect 12. The method of Aspect 10, further comprising: receiving a request for additional user information from the service provider; extracting the requested additional user information from the anonymous identifier token; and transmitting the requested additional user information to the service provider.

Aspect 13. The method of Aspect 12, further comprising: receiving data from the service provider; and adding the data from the service provider to the anonymous identifier token.

Aspect 14. The method of any of Aspects 10-13, further comprising: receiving a service token associated with the service provider; adding the service token to the anonymous identifier token; and transmitting the service token to the service provider.

Aspect 15. The method of Aspect 14, wherein the service token is received from an anonymous identifier token cloud service.

Aspect 16. An apparatus for authentication, comprising: a memory; and a processor coupled to the memory and configured to: receive first authentication information for a user; generate an authentication token based on the received first authentication information, wherein the authentication token does not include the first authentication information; receive user information for the user; obtain an anonymous identifier token, wherein the anonymous identifier token comprises a composite token, and wherein the anonymous identifier token includes an identity token generated based on the received user information; add the authentication token to the anonymous identifier token; and store the anonymous identifier token for authenticating a user.

Aspect 17. The apparatus of Aspect 16, wherein the processor is further configured to: obtain a vehicle token, the vehicle token associated with a vehicle, and wherein the vehicle token indicates the user has access to the vehicle; add the vehicle token to the anonymous identifier token.

Aspect 18. The apparatus of Aspect 17, wherein the vehicle token includes vehicle personalization information.

Aspect 19. The apparatus of any of Aspects 16-18, wherein the processor is further configured to: receive second authentication information for the user; and retrieve the anonymous identifier token corresponding to the user based on the received second authentication information.

Aspect 20. The apparatus of any of Aspects 16-19, wherein the first authentication information comprises biometric information.

Aspect 21. The apparatus of any of Aspects 16-20, wherein the processor is further configured to transmit the anonymous identifier token to another device for authenticating the user based on the authentication token.

Aspect 22. The apparatus of any of Aspects 16-21, wherein, to obtain the anonymous identifier token, the processor is configured to: transmit the user information to an anonymous identifier token cloud service; and receive the anonymous identifier token from the anonymous identifier token cloud service.

Aspect 23. The apparatus of any of Aspects 16-22, wherein, to obtain the anonymous identifier token, the processor is configured to: generate the identity token; generate the anonymous identifier token; and add the identity token to the anonymous identifier token.

Aspect 24. The apparatus of any of Aspects 16-23, wherein the processor is further configured to: receive a request to register for an event from a service provider; and establish a channel for notifying the service provider of an occurrence of the event.

Aspect 25. The apparatus of Aspect 24, wherein the processor is further configured to: determine that the event has occurred; extract the identity token from the anonymous identifier token; and transmit the identity token to the service provider via the channel.

Aspect 26. The apparatus of Aspect 25, wherein the identity token comprises an encrypted identity token for attestation by an anonymous identifier token cloud service.

Aspect 27. The apparatus of Aspect 25, wherein the processor is further configured to: receive a request for additional user information from the service provider; extract the requested additional user information from the anonymous identifier token; and transmit the requested additional user information to the service provider.

Aspect 28. The apparatus of Aspect 27, wherein the processor is further configured to: receive data from the service provider; and add the data from the service provider to the anonymous identifier token.

Aspect 29. The apparatus of any of Aspects 25-28, wherein the processor is further configured to: receive a service token associated with the service provider; add the service token to the anonymous identifier token; and transmit the service token to the service provider.

Aspect 30. The apparatus of Aspect 29, wherein the service token is received from an anonymous identifier token cloud service Aspect 31. The method of any of Aspects 12, wherein the additional user information comprises a payment token.

Aspect 32. The method of Aspect 31, wherein the request to register for the event includes a payment token, and further comprising: obtain third authentication information for the user in response to the request to register for the event; identifying the anonymous identifier token associated with the user based on the third authentication information; adding the payment token to the anonymous identifier token; and sending the anonymous identifier token to the service provider.

Aspect 33: A non-transitory computer-readable medium having stored thereon instructions that, when executed by at least one processor, cause the at least one processor to performing operations according to any of Aspects 16-32.

Aspect 34: An apparatus for authentication, comprising one or more means for performing operations according to any of Aspects 16-32

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for authentication, comprising:

a memory; and a processor coupled to the memory and configured to:

receive first authentication information for a user;

generate an authentication token based on the received first authentication information, wherein the authentication token does not include the first authentication information;

receive user information for the user;

obtain an anonymous identifier token, wherein the anonymous identifier token is a composite token and includes an identity token generated based on the received user information;

add, after the anonymous identifier token is obtained, the authentication token to the anonymous identifier token; and store the anonymous identifier token for authenticating the user.

2. The apparatus of claim 1, wherein the processor is further configured to:

receive a request to register for an event from a service provider; and establish a channel for notifying the service provider of an occurrence of the event.

3. The apparatus of claim 2, wherein the processor is further configured to:

determine that the event has occurred;

extract, in response to the determination that the event has occurred, the identity token from the anonymous identifier token; and transmit the identity token to the service provider via the channel.

4. The apparatus of claim 3, wherein the identity token comprises an encrypted identity token for attestation by an anonymous identifier token cloud service.

5. The apparatus of claim 3, wherein the processor is further configured to:

receive a request for additional user information from the service provider;

extract the requested additional user information from the anonymous identifier token; and transmit the requested additional user information to the service provider.

6. The apparatus of claim 5, wherein the processor is further configured to:

receive data from the service provider; and add the data from the service provider to the anonymous identifier token.

7. The apparatus of claim 3, wherein the processor is further configured to:

receive a service token associated with the service provider;

add the service token to the anonymous identifier token; and transmit the service token to the service provider.

8. The apparatus of claim 7, wherein the service token is received from an anonymous identifier token cloud service.

9. A method for authentication, the method comprising:

receiving first authentication information for a user;

generating an authentication token based on the received first authentication information, wherein the authentication token does not include the first authentication information;

receiving user information for the user;

obtaining an anonymous identifier token, wherein the anonymous identifier token comprises a composite token, and wherein the anonymous identifier token includes an identity token generated based on the received user information;

adding, after obtaining the anonymous identifier token, the authentication token to the anonymous identifier token; and storing the anonymous identifier token for authenticating the user.

10. The method of claim 9, further comprising:

receiving a request to register for an event from a service provider; and establishing a channel for notifying the service provider of an occurrence of the event.

11. The method of claim 10, further comprising:

determining that the event has occurred;

extracting, in response to determining that the event has occurred, the identity token from the anonymous identifier token; and transmitting the identity token to the service provider via the channel.

12. The method of claim 11, wherein the identity token comprises an encrypted identity token for attestation by an anonymous identifier token cloud service.

13. The method of claim 11, further comprising:

receiving a request for additional user information from the service provider;

extracting the requested additional user information from the anonymous identifier token; and transmitting the requested additional user information to the service provider.

14. The method of claim 13, further comprising:

receiving data from the service provider; and adding the data from the service provider to the anonymous identifier token.

15. The method of claim 11, further comprising:

receiving a service token associated with the service provider;

adding the service token to the anonymous identifier token; and transmitting the service token to the service provider.

16. The method of claim 15, wherein the service token is received from an anonymous identifier token cloud service.

* * * * *